US012312985B1

(12) United States Patent
Omoto et al.

(10) Patent No.: US 12,312,985 B1
(45) Date of Patent: May 27, 2025

(54) ENGINE AND EXHAUST SYSTEM

(71) Applicant: KAWASAKI MOTORS, LTD., Hyogo (JP)

(72) Inventors: Keisuke Omoto, Akashi (JP); Matthew Colombo, Grand Rapids, MI (US); Jakob Daniel Cook, Grand Rapids, MI (US); Shuichi Yonaiyama, Akashi (JP); Kazuki Masui, Grand Rapids, MI (US)

(73) Assignee: KAWASAKI MOTORS, LTD., Hyogo (JP)

( * ) Notice: Subject to any disclaimer, the term of this patent is extended or adjusted under 35 U.S.C. 154(b) by 0 days.

(21) Appl. No.: 18/732,139

(22) Filed: Jun. 3, 2024

(51) Int. Cl.
*F01N 13/10* (2010.01)
*F02B 75/22* (2006.01)

(52) U.S. Cl.
CPC ............ *F01N 13/10* (2013.01); *F02B 75/221* (2013.01)

(58) Field of Classification Search
CPC ...... F01N 13/10; F01N 3/2885; F02B 75/221; F02B 75/228
See application file for complete search history.

(56) References Cited

U.S. PATENT DOCUMENTS

| | | | | |
|---|---|---|---|---|
| 8,668,538 B1 * | 3/2014 | Langenfeld | B63H 21/34 440/89 H | |
| 2021/0189942 A1 * | 6/2021 | Wolk | F01N 13/10 | |

FOREIGN PATENT DOCUMENTS

| | | | | |
|---|---|---|---|---|
| CN | 111322147 A * | 6/2020 | | |
| CN | 117090705 A * | 11/2023 | | |
| DE | 102008027328 A1 * | 12/2009 | F01N 13/009 | |
| EP | 4296481 A1 * | 12/2023 | F01N 13/10 | |
| JP | 2022009506 A * | 1/2022 | | |
| WO | 2022/180742 A1 | 9/2022 | | |
| WO | WO-2022190252 A1 * | 9/2022 | F01N 13/10 | |
| WO | WO-2022190253 A1 * | 9/2022 | F01N 13/107 | |

OTHER PUBLICATIONS

English translation of JP2022009506A provided by Clarivate.*
English translation of WO2022190253A1 provided by Clarivate.*

* cited by examiner

*Primary Examiner* — Ngoc T Nguyen
(74) *Attorney, Agent, or Firm* — XSENSUS LLP

(57) ABSTRACT

An engine includes an engine main body including a first cylinder and a second cylinder, a first exhaust pipe that is connected to the engine main body, a second exhaust pipe that is connected to the engine main body, and an exhaust manifold including a first inlet portion connected to a first lead-out portion that is a downstream end of the first exhaust pipe, a second inlet portion connected to a second lead-out portion that is a downstream end of the second exhaust pipe, and a common outlet portion that leads out exhaust gas flowing in from the first inlet portion and the second inlet portion, in which the first lead-out portion and the second lead-out portion face each other with central axes of the first lead-out portion and the second lead-out portion aligning on a same line.

19 Claims, 12 Drawing Sheets

ENGINE AND EXHAUST SYSTEM

FIELD OF INVENTION

The present disclosure relates to an engine and an exhaust system.

BACKGROUND ART

An engine disclosed in WO2022/180742A1 is known as one type of an engine mounted on a work machine or the like. In such an engine, it is desired to improve the degree of freedom of mounting onto a work machine or the like.

SUMMARY OF THE INVENTION

The present disclosure has been made in view of the above circumstances, and an object of the present disclosure is to provide an engine and an exhaust system having a high degree of freedom in mounting.

In order to solve the above problem, an engine according to one aspect of the present disclosure includes an engine main body including a first cylinder and a second cylinder, a first exhaust pipe that is connected to the engine main body and into which exhaust gas is introduced from the first cylinder, a second exhaust pipe that is connected to the engine main body and into which exhaust gas is introduced from the second cylinder, and an exhaust manifold including a first inlet portion connected to a first lead-out portion that is a downstream end of the first exhaust pipe, a second inlet portion connected to a second lead-out portion that is a downstream end of the second exhaust pipe, and a common outlet portion that leads out exhaust gas flowing in from the first inlet portion and the second inlet portion, in which the first lead-out portion and the second lead-out portion face each other with central axes of the first lead-out portion and the second lead-out portion aligning on a same line.

DETAILED DESCRIPTION

Preferred embodiments of an engine according to the present disclosure will be described below with reference to the drawings.

[Entire Configuration of Engine]

Figure 1:
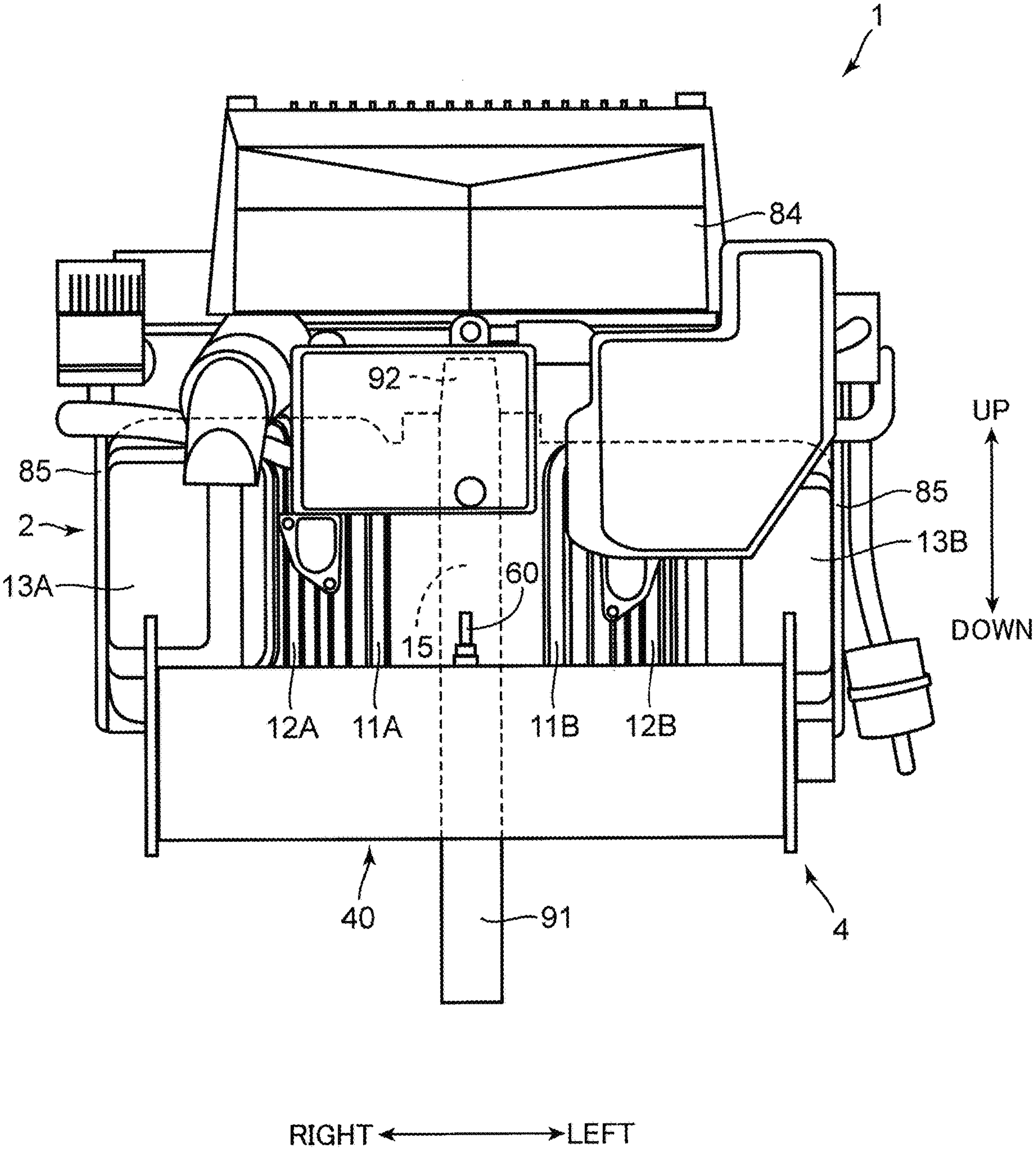
FIG. 1 is a schematic front view of an engine according to a first embodiment of the present disclosure as viewed from the front.
Figure 2:
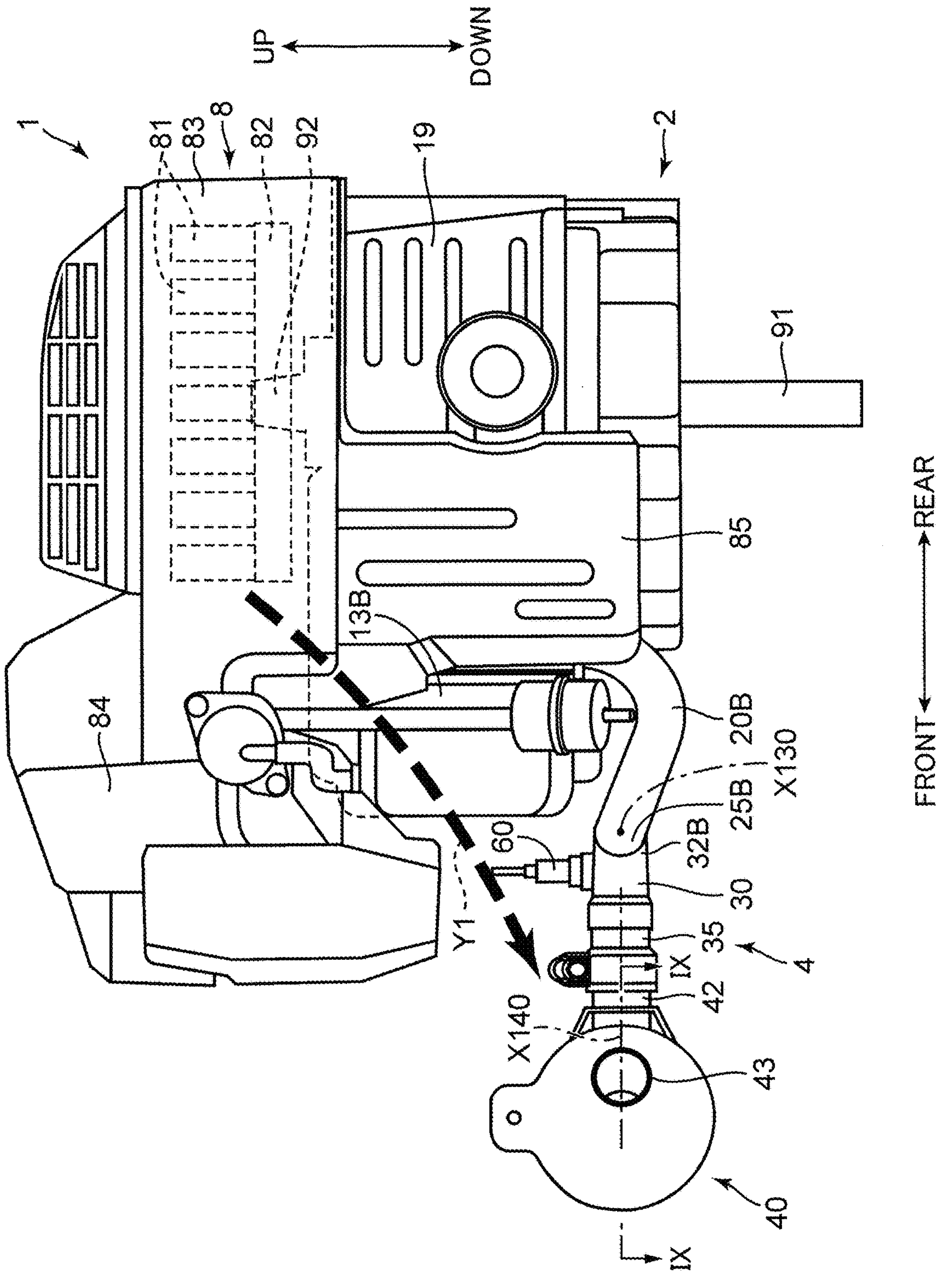
FIG. 2 is a schematic side view of the engine.
Figure 3:
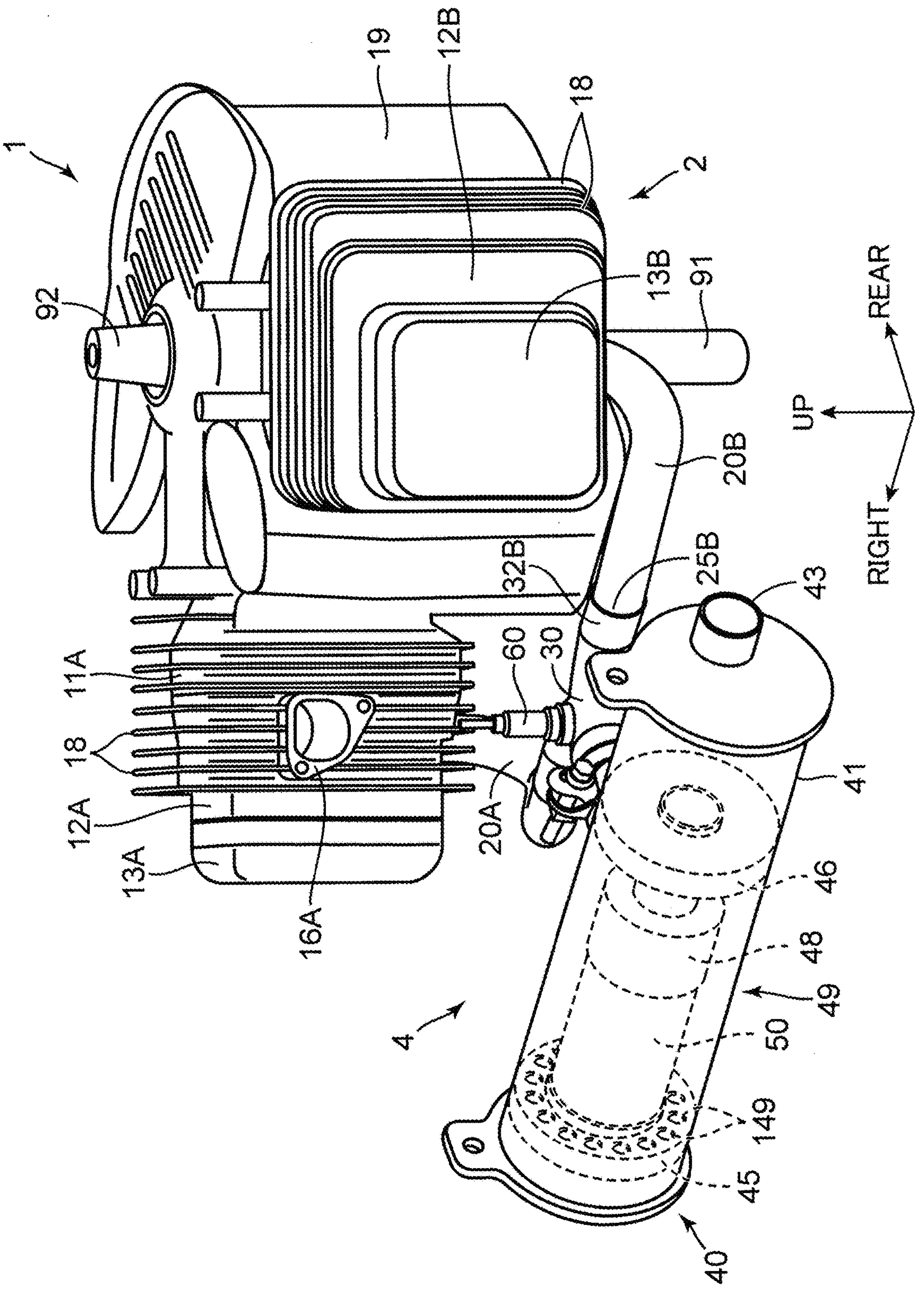
FIG. 3 is a schematic perspective view of an engine main body and an exhaust system of the engine.
Figure 4:
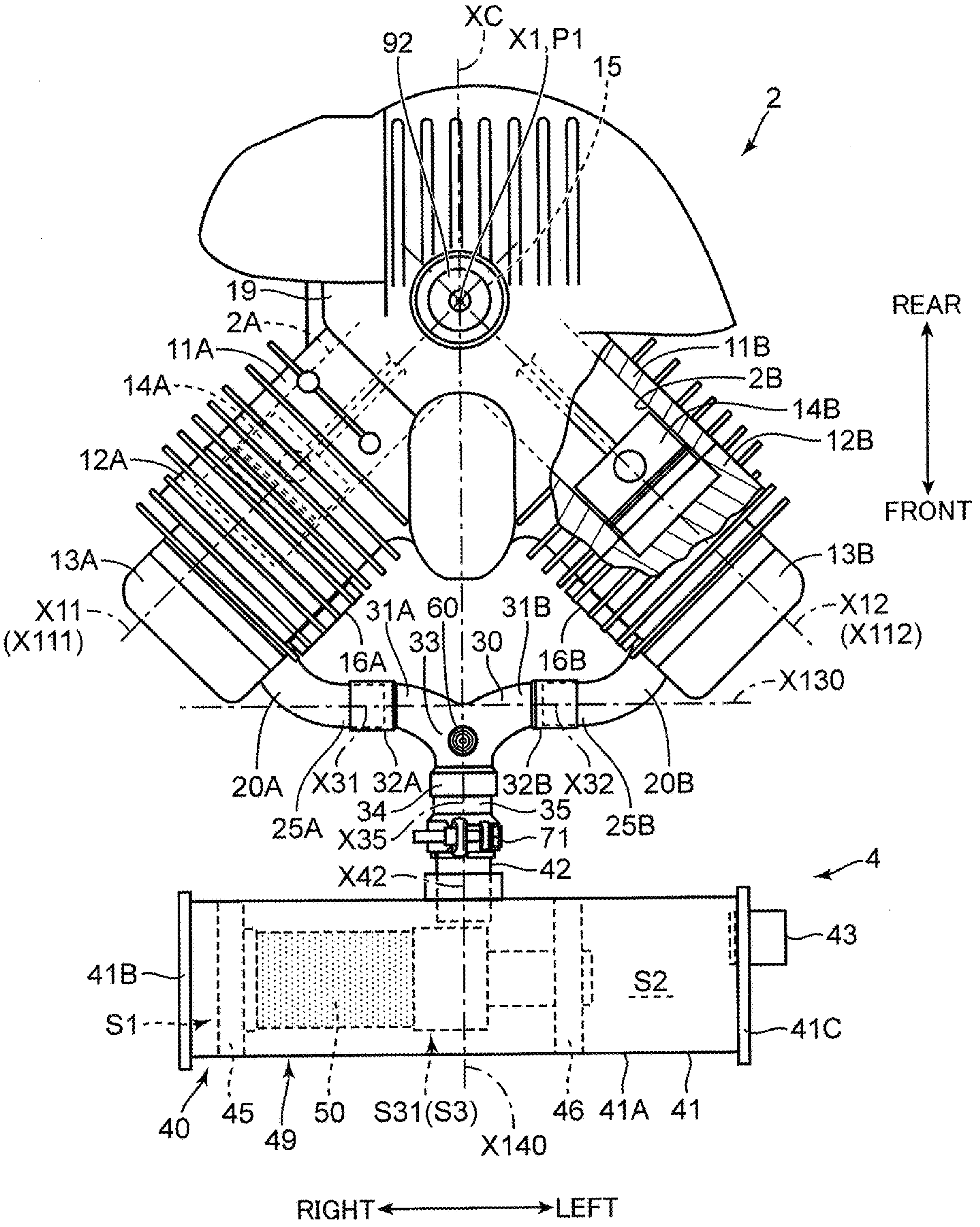
FIG. 4 is a schematic plan view of the engine main body and the exhaust system.
Figure 5:
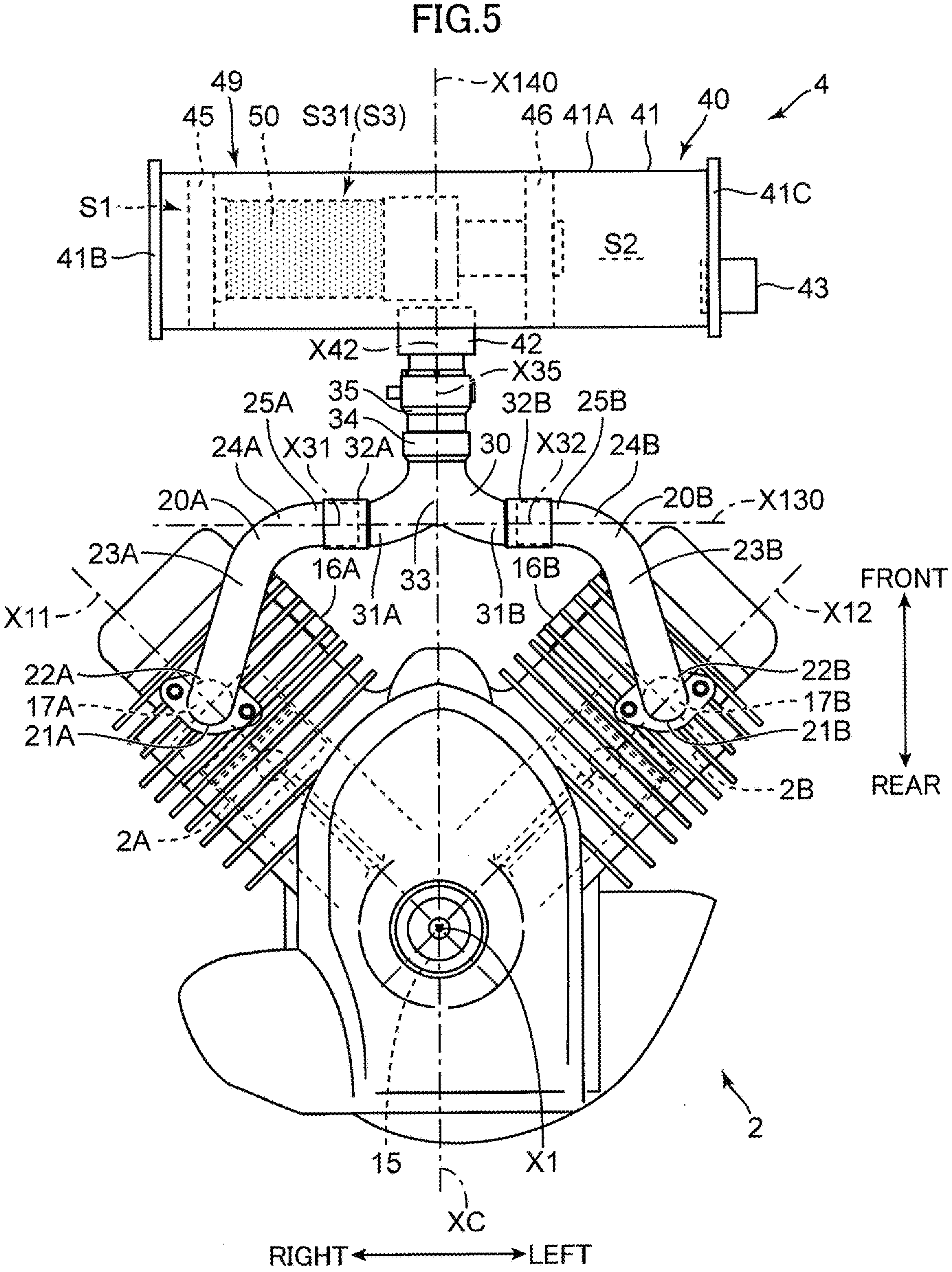
FIG. 5 is a schematic bottom view of the engine main body and the exhaust system.

FIG. 1 is a schematic front view of an engine 1 according to a first embodiment of the present disclosure. FIG. 2 is a schematic side view of the engine 1. The engine 1 of the present disclosure includes an engine main body 2, an exhaust system 4, and a fan 8. The engine 1 is mounted on a vehicle. For example, the engine 1 is mounted on a riding type lawn mower and is used as a traveling source of the lawn mower and a driving source of a cutting blade. Lawn mowers may be designed with an exhaust direction of the engine being different depending on an exhaust direction of mown grass and placements of mounted components other than the engine. In this case, the mounting attitude of the engine and the exhaust manifold shape are determined depending on the exhaust direction of the engine. FIG. 3 is a schematic perspective view of the engine main body 2 and the exhaust system 4. FIG. 4 is a schematic plan view of the engine main body 2 and the exhaust system 4. FIG. 5 is a schematic bottom view of the engine main body 2 and the exhaust system 4. In FIG. 4, a part of the engine main body 2 is cut away. Further, in FIGS. 3 to 5, an internal structure of a downstream device 40, described later, of the exhaust system 4 is indicated by a broken line.

The engine main body 2 is a reciprocating engine. The engine main body 2 is a so-called V-twin engine including two cylinders 2A and 2B.

The engine main body 2 includes a pair of cylinder blocks 11A and 11B, a pair of cylinder heads 12A and 12B, and a pair of head covers 13A and 13B. The cylinder heads 12A and 12B are fastened to the cylinder blocks 11A and 11B, respectively. The head covers 13A and 13B are attached to the cylinder heads 12A and 12B, respectively.

The cylinder 2A is provided in the cylinder blocks 11A, and the cylinder 2B is provided in the cylinder block 11B. The inner peripheral surface of each of the cylinders 2A and 2B has a cylindrical surface shape. The engine main body 2 includes a first piston 14A. The first piston 14A reciprocates in the first cylinder 2A, which is one cylinder 2A, along a first cylinder axis line X11, which is its axis line. The engine main body 2 includes a second piston 14B. The second piston 14B reciprocates in the second cylinder 2B, which is the other cylinder 2B, along a second cylinder axis line X12, which is its axis line. The engine main body 2 includes a crankshaft 15. The crankshaft 15 is connected to both of the two pistons 14A and 14B. The crankshaft 15 is rotationally driven by the two pistons 14A and 14B. The engine main body 2 includes a crank case 19. The crank case 19 is connected to the cylinder blocks 11A and 11B. The crankshaft 15 is housed inside the crank case 19.

The crankshaft 15 extends in an up-and-down direction, that is, in a vertical direction. A crank axis line X1, which is a rotation center line of the crankshaft 15, extends in the up-and-down direction. The first cylinder axis line X11 and the second cylinder axis line X12 extend horizontally. As described above, the engine main body 2 is used in an attitude in which the crank axis line X1 extends in the up-and-down direction and the cylinder axis lines X11 and X12 extend horizontally. In other words, the engine main body 2 is designed to be mounted on a work machine in a state where the crank axis line X1 extends vertically. Note that the engine 1 includes an oil pan that stores engine oil. The oil pan is disposed on one side in a direction along the crank axis line X1 with respect to the engine main body 2. In the present embodiment, the oil pan is disposed below the engine main body 2.

When viewed along the crank axis line X1, that is, when viewed along the up-and-down direction, the first cylinder axis line X11 and the second cylinder axis line X12 intersect so as to form a V shape. Specifically, as viewed along the up-and-down direction, the first cylinder axis line X11 and the second cylinder axis line X12 intersect each other. A line segment being on the first cylinder axis line X11 and extending toward the first cylinder 2A from an intersection P1 between the first cylinder axis line X11 and the second cylinder axis line X12 is defined as a first reference line X111. A line segment being on the second cylinder axis line X12 and extending toward the second cylinder 2B from the intersection P1 is defined as a second reference line X112. The first reference line X111 and the second reference line X112 form an angle of less than 180 degrees, and form a V shape. When viewed along the up-and-down direction, the intersection P1 is located at a point on the crank axis line X1.

In the present embodiment, as viewed along the up-and-down direction, the center line XC dividing the entire engine main body 2 into halves divides the angle formed by the first reference line X111 and the second reference line X112 into two equal parts. Hereinafter, a direction along the center line XC is referred to as a front-and-rear direction. The cylinders 2A and 2B are separated from the crankshaft 15 in the front-and-rear direction. Hereinafter, the crankshaft 15 side with respect to each of the cylinders 2A and 2B is referred to as a rear side, and the opposite side is referred to as a front side. In addition, a direction orthogonal to the up-and-down direction and the front-and-back direction is referred to as a right-and-left direction. Note that the directions illustrated in the drawings indicate the directions defined as described above. Further, in the drawings, the cylinder located on the right side between the two cylinders 2A and 2B is illustrated as the first cylinder 2A, and the cylinder located on the left side is illustrated as the second cylinder 2B. Also in the following description, the cylinder located on the right side is referred to as the first cylinder 2A, and the cylinder located on the left side is referred to as the second cylinder 2B.

Intake ports 16A and 16B for introducing intake air into the cylinders 2A and 2B are formed in the cylinder heads 12A and 12B, respectively. The first intake port 16A corresponding to the first cylinder 2A is opened on the left side surface of the first cylinder head 12A. The second intake port 16B corresponding to the second cylinder 2B is opened on the right side surface of the second cylinder head 12B. Note that each of the intake ports 16A and 16B is connected to an intake system device such as an intake pipe, but illustration of the intake system device is omitted.

Exhaust ports 17A and 17B for leading out exhaust gas generated in the cylinders 2A and 2B from the cylinders 2A and 2B are formed in the cylinder heads 12A and 12B, respectively. A first exhaust port 17A and a second exhaust port 17B are arranged in the right-and-left direction. The first exhaust port 17A corresponding to the first cylinder 2A is opened on a lower surface of the first cylinder head 12A. The second exhaust port 17B corresponding to the second cylinder 2B is opened on a lower surface of the second cylinder head 12B. As viewed along the up-and-down direction, the first exhaust port 17A and the second exhaust port 17B are formed at positions approximately symmetrical with respect to the center line XC.

The engine 1 includes a first output shaft 91 and a second output shaft 92 that are rotatable integral with the crankshaft 15. The first output shaft 91 protrudes downward from the lower surface of the crank case 19. The first output shaft 91 is connected to a wheel, a cutting blade, or the like, and rotates the wheel, the cutting blade, or the like. The second output shaft 92 protrudes upward from the upper surface of the crank case 19.

The engine main body 2 is an air-cooled engine. A plurality of cooling fins 18 is provided on outer surfaces of the cylinder blocks 11A and 11B and the cylinder heads 12A and 12B.

The fan 8 sends wind to the engine main body 2 to cool the engine main body 2. The fan 8 is disposed above the crank case 19. The crank case 19 constitutes a rear portion of the engine main body 2. The fan 8 is disposed above the rear portion of the engine main body 2.

The fan 8 has a fan main body 82 including a plurality of blades 81, and a fan case 83 surrounding an outer periphery of the fan main body 82. The fan main body 82 is connected to the second output shaft 92. The fan main body 82 is rotationally driven by the second output shaft 92. The fan 8 is a centrifugal fan. When the fan main body 82 rotates, air is taken in from above the fan main body 82 and is discharged to the outer peripheral side of the fan main body 82.

The fan case 83 extends to the front side of fan main body 82. A front portion of the fan case 83 is generally covered with a device 84 of an intake system or the like. The engine 1 is provided with a cover 85. The cover 85 includes a portion extending downward from a right edge of a front portion of the fan case 83, and a portion extending downward from a left edge of a front portion of the fan case 83. The cover 85 is disposed so as to cover both left and right sides of the engine main body 2. With this configuration, the air discharged to the outer peripheral side of the fan main body 82 is mainly guided diagonally downward front from the front portion of the fan main body 82 as indicated by arrow Y1 in FIG. 2. As illustrated in FIG. 2, the front portion of the engine main body 2 including the cylinder blocks 11A and 11B and the cylinder heads 12A and 12B are disposed at a diagonally downward front position of the fan main body 82. As a result, the cylinder blocks 11A and 11B and the cylinder heads 12A and 12B are cooled by the air released by the fan 8.

The exhaust system 4 is a system that discharges the exhaust gas generated in each of the cylinders 2A and 2B into the atmosphere. The exhaust system 4 is connected to the engine main body 2.

[Exhaust System]

Figure 6:
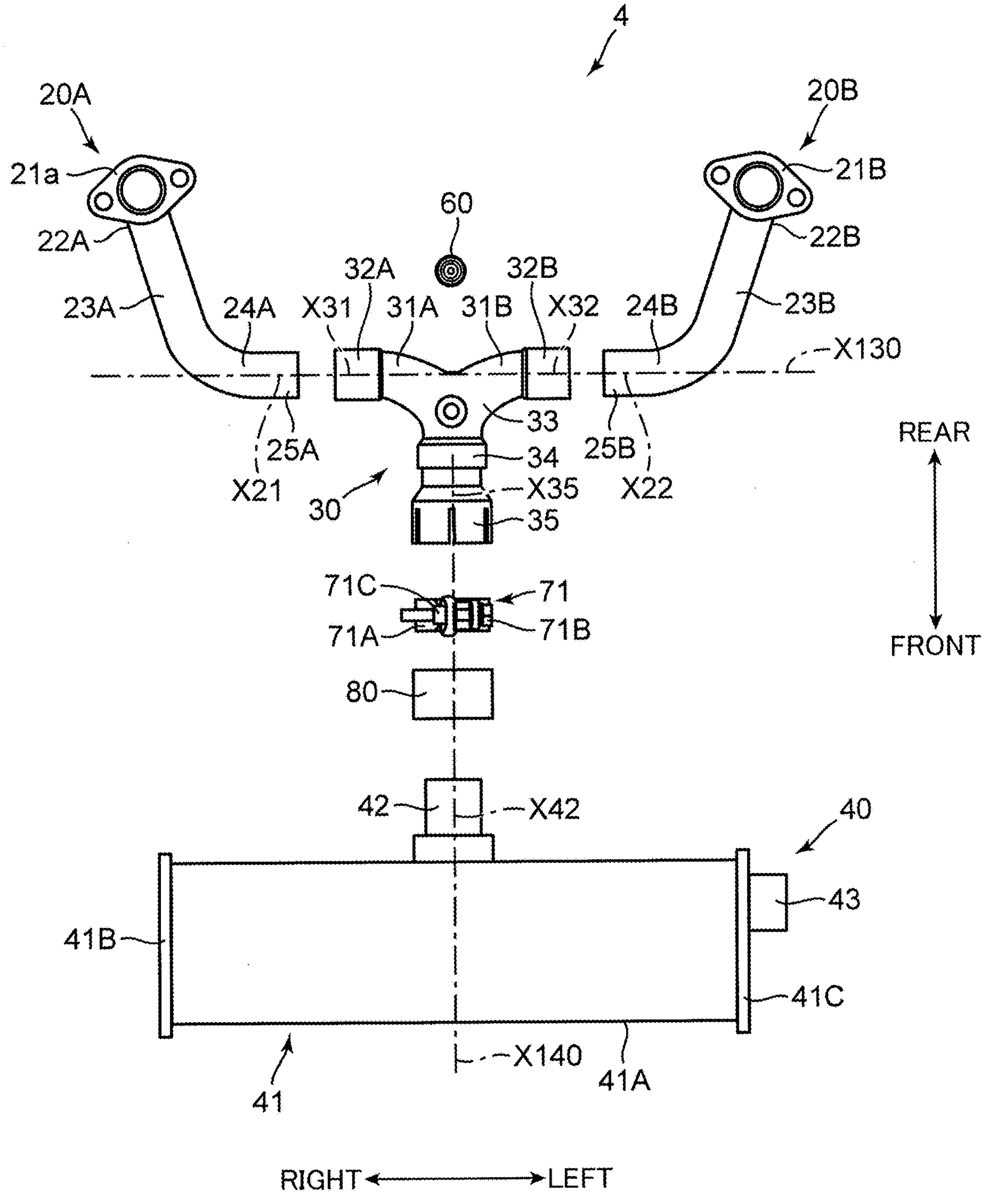
FIG. 6 is a schematic plan view illustrating the exhaust system in a disassembled manner.
Figure 7:
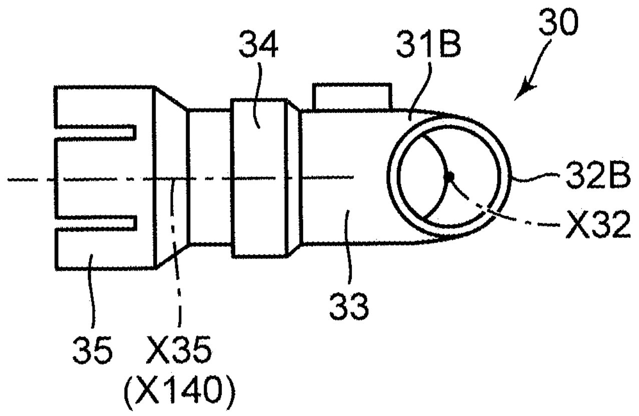
FIG. 7 is a side view illustrating a part of an exhaust manifold of the exhaust system.
Figure 8:
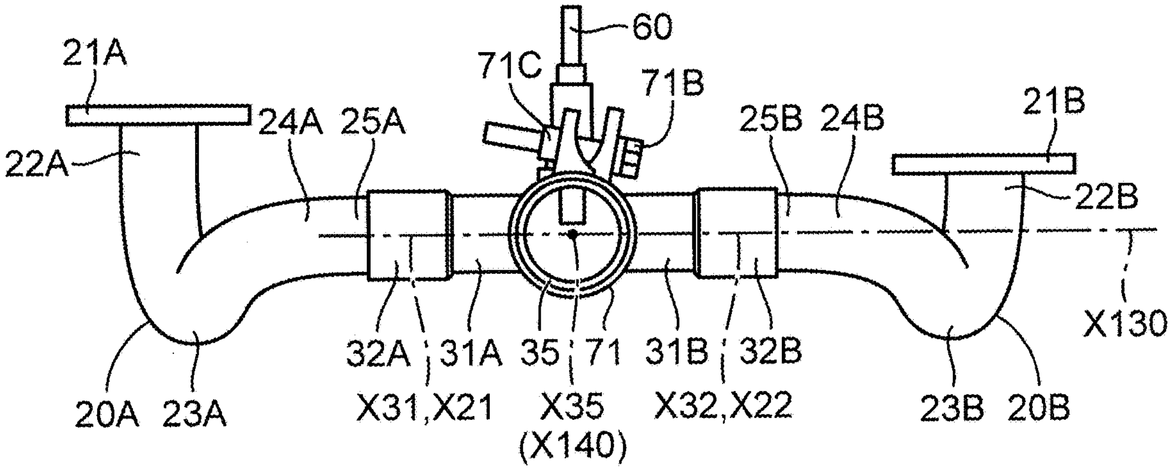
FIG. 8 is a front view of the exhaust system from which a downstream device is removed.

Hereinafter, a detailed configuration of the exhaust system 4 will be described. FIG. 6 is a schematic plan view illustrating the exhaust system 4 in a disassembled manner. FIG. 7 is a side view illustrating an exhaust manifold 30, described later, of the exhaust system 4. FIG. 8 is a front view of the exhaust system 4 from which a downstream device 40 is removed.

The exhaust system 4 includes a pair of exhaust pipes 20A and 20B, an exhaust manifold 30, and the downstream device 40. These components 20A, 20B, 30, and 40 define an exhaust passage through which exhaust gas flows. The pair of exhaust pipes 20A and 20B, the exhaust manifold 30, and the downstream device 40 are provided in this order from the upstream side in the flow direction of the exhaust gas. The exhaust pipes 20A and 20B are connected to the engine main body 2. The exhaust system 4 includes an exhaust gas sensor 60 that detects the property of the exhaust gas. The exhaust gas sensor 60 is, for example, an O2 sensor that detects an oxygen concentration of the exhaust gas. Specifically, the O2 sensor outputs, as a detection result, whether the exhaust gas is combusted at an ideal air-fuel ratio base on the property of the exhaust gas. Note that the exhaust gas sensor 70 is not limited to one that detects the oxygen concentration of the exhaust. For example, the exhaust gas sensor 70 may detect an exhaust temperature or the like. Hereinafter, the upstream side and the downstream side in the flow direction of the exhaust gas are simply referred to as upstream side and downstream side as appropriate.

Here, as described later, the attitude of the exhaust manifold 30 with respect to the exhaust pipes 20A and 20B can be changed. That is, the attitude of the exhaust manifold 30 is not limited to attitudes illustrated in FIGS. 1 to 5. However, the configuration of the exhaust manifold 30 will be described below using a direction where the exhaust manifold 30 is at the attitudes illustrated in FIGS. 1 to 5. Similarly, the attitude of the downstream device 40 with respect to the exhaust manifold 30 is not limited to the attitudes illustrated in FIGS. 1 to 5. However, the configuration of the downstream device 40 will be described below using a direction where the downstream device 40 is in the attitudes illustrated in FIGS. 1 to 5.

The first exhaust pipe 20A, which is one exhaust pipe, communicates with the first exhaust port 17A. The exhaust gas is introduced into the first exhaust pipe 20A from the first cylinder 2A via the first exhaust port 17A. The first exhaust pipe 20A is fixed to the lower surface of the first cylinder head 12A. An upstream end 21A of the first exhaust pipe 20A communicates with an open end of the first exhaust port 17A.

The first exhaust pipe 20A extends downward from the lower surface of the first cylinder head 12A, then extends diagonally leftward front, and then extends leftward. Specifically, the first exhaust pipe 20A includes a first upstream portion 22A, a first intermediate portion 23A, and a first downstream portion 24A. The first upstream portion 22A extends downward from the lower surface of the first cylinder head 12A. The first intermediate portion 23A extends diagonally leftward front from the lower end of the first upstream portion 22A. The first downstream portion 24A extends leftward from the front end of the first intermediate portion 23A. More specifically, the first intermediate portion 23A tilts diagonally upward front from the lower end of the first upstream portion 22A. The connecting portions of the respective portions are curved, and the respective portions are smoothly connected.

A first lead-out portion 25A, which is a downstream end of the first exhaust pipe 20A, that is, a downstream end, is configured by a left end portion of the first downstream portion 24A. The first lead-out portion 25A has a tubular shape extending in the right-and-left direction. A central axis X21 of the first lead-out portion 25A extends in the right-and-left direction. The first lead-out portion 25A is opened leftward.

The second exhaust pipe 20B, which is the other exhaust pipe 20B, communicates with the second exhaust port 17B. The exhaust gas is introduced into the second exhaust pipe 20B from the second cylinder 2B via the second exhaust port 17B. The second exhaust pipe 20B is fixed to the lower surface of the second cylinder head 12B. An upstream end 21B of the second exhaust pipe communicates with an open end of the second exhaust port 17B.

The second exhaust pipe 20B has an approximately right-left symmetrical structure with the first exhaust pipe 20A. The second exhaust pipe 20B extends downward from the lower surface of the second cylinder head 12B, then extends diagonally rightward front, and then extends rightward. Specifically, the second exhaust pipe 20B includes a second upstream portion 22B, a second intermediate portion 23B, and a second downstream portion 24B. The second upstream portion 22B extends downward from the lower surface of the second cylinder head 12B. The second intermediate portion 23B extends diagonally rightward front from the lower end of the second upstream portion 22B. The second downstream portion 24B extends leftward from the front end of the second intermediate portion 23B. More specifically, the second intermediate portion 23B tilts upward forward from the lower end of the second upstream portion 22B. The connecting portions of the respective portions are curved, and the respective portions are smoothly connected.

A second lead-out portion 25B, which is a downstream end of the second exhaust pipe 20B, is configured by a right end of the second downstream portion 24B. The second lead-out portion 25B has a tubular shape extending in the right-and-left direction. A central axis X22 of the second lead-out portion extends in the right-and-left direction. The second lead-out portion 25B is opened rightward.

The first lead-out portion 25A and the second lead-out portion 25B are coaxially disposed. Specifically, a central axis X31 of the first lead-out portion 25A and the central axis X32 of the second lead-out portion 25B are aligned on a same axis line X130. That is, the central axis line of the first lead-out portion 25A and the central axis line of the second lead-out portion 25B are aligned on the axis line X130. Hereinafter, the axis line X130 is appropriately referred to as a first axis line X130. In the present embodiment, the first axis line X130 is a straight line extending in the left-right direction.

The first lead-out portion 25A and the second lead-out portion 25B face each other in the left-right direction. Specifically, the first lead-out portion 25A is located on the right side of the center line XC. The second lead-out portion 25B is located on the left side of the center line XC. The first lead-out portion 25A and the second lead-out portion 25B face each other in the left-right direction with the center line XC being interposed therebetween. In the present embodiment, as viewed along the up-and-down direction, the first lead-out portion 25A and the second lead-out portion 25B are disposed at positions symmetrical with respect to the center line XC.

In the present embodiment, the first exhaust pipe 20A and the second exhaust pipe 20B are configured by round pipes. As a result, the first lead-out portion 25A has a cylindrical shape, and both the outer peripheral surface and the inner peripheral surface of the first lead-out portion 25A have a cylindrical shape. Similarly, the second lead-out portion 25B has a cylindrical shape, and both the outer peripheral surface and the inner peripheral surface of the second lead-out portion 25B have a cylindrical shape.

The exhaust manifold 30 is connected to the first exhaust pipe 20A and the second exhaust pipe 20B. The exhaust gas that has passed through the first exhaust pipe 20A and the second exhaust pipe 20B is introduced into the exhaust manifold 30.

The exhaust manifold 30 is disposed between the first reference line X111 and the second reference line X112 and on the center line XC as viewed along the up-and-down direction. Further, the exhaust manifold 30 is disposed in a path of wind sent from the fan 8. Specifically, the exhaust manifold 30 is disposed at a position in front of the lower portion of the engine main body 2 and diagonally downward front from the front portion of the fan main body 82. As a result, the exhaust manifold 30 receives the wind sent from the fan 8 and is cooled by the wind.

The upstream portion of the exhaust manifold 30 is bifurcated. The exhaust manifold 30 includes a first branch portion 31A, a second branch portion 31B, and a collective portion 34. The first branch portion 31A and the second branch portion 31B constitute an upstream portion of the exhaust manifold 30. The collective portion 34 constitutes a downstream portion of the exhaust manifold 30.

The exhaust gas generated in the first cylinder 2A is introduced into the first branch portion 31A via the first lead-out portion 25A and the first exhaust pipe 20A. The first branch portion 31A has a first inlet portion 32A. The first inlet portion 32A is connected to and communicates with the first lead-out portion 25A. The first inlet portion 32A constitutes an upstream end of the first branch portion 31A, that is, an end of an upstream side. The first branch portion 31A extends leftward from the first lead-out portion 25A. The first inlet portion 32A constitutes a right end of the first branch portion 31A. The first inlet portion 32A has a tubular shape extending in the right-and-left direction. The central axis X31 of the first inlet portion 32A extends in the right-and-left direction.

The exhaust gas generated in the second cylinder 2B is introduced into the second branch portion 31B via the second lead-out portion 25B and the second exhaust pipe 20B. The second branch portion 31B has a second inlet portion 32B. The second inlet portion 32B is connected to and communicates with the second lead-out portion 25B. The second inlet portion 32B constitutes an upstream end of the second branch portion 31B. The second branch portion 31B extends rightward from the second lead-out portion 25B. The second inlet portion 32B constitutes a left end of the second branch portion 31B. The second inlet portion 32B has a tubular shape extending in the right-and-left direction. The central axis X32 of the second inlet portion 32B extends in the right-and-left direction.

The first inlet portion 32A has a shape that, in a case where the exhaust manifold 30 is rotated about the first axis line X130 from a first position to a second position, overlaps with a shape in a case where the exhaust manifold 30 is at the first position. That is, the first inlet portion 32A has a cross section that is orthogonal to the first axis line X130 and has a shape constant between the cases where the exhaust manifold 30 is at the first position and the exhaust manifold 30 is at the second position. The first position is a position illustrated in FIG. 2. The second position is a position where the exhaust manifold 30 is rotated from the first position about the first axis line 130 and is different from the first position.

Similarly, the second inlet portion 32B has a shape that, in a case where the exhaust manifold 30 is rotated about the first axis line X130 from the first position to the second position, overlap with a shape in a case where the exhaust manifold 30 is at the first position. That is, the second inlet portion 32B has a cross section that is orthogonal to the first axis line X130 and has a shape constant between the cases where the exhaust manifold 30 is at the first position and the exhaust manifold 30 is at the second position.

In the present embodiment, the first inlet portion 32A and the second inlet portion 32B each have a cylindrical shape. The cross sections, which are orthogonal to the first axis line X130, of the first inlet portion 32A and the second inlet portion 32B each have an annular shape. The central axis X31 of the first inlet portion 32A and the central axis X32 of the second inlet portion 32B are aligned on the first axis line X130. That is, the central axis lines of the first inlet portion 32A and the second inlet portion 32B and the central axis lines of the first lead-out portion 25A and the second lead-out portion 25B each are the first axis line X130. Therefore, in the present embodiment, regardless of the angle of rotation of the exhaust manifold 30 about the first axis line X130, the cross section of the first inlet portion 32A and the cross section of the second inlet portion 32B have constant shapes before and after the rotation at all positions along the first axis line X130. All the positions around the first axis line X130 except the first position correspond to the second position. Note that each inner peripheral surface and each outer peripheral surface of the first inlet portion 32A and the second inlet portion 32B have a cylindrical shape. The central axis X31 of the first inlet portion 32A is identical to the central axes of the inner peripheral surface and the outer peripheral surface of the first inlet portion 32A. The central axis X32 of the second inlet portion 32B is identical to the central axes of the inner peripheral surface and the outer peripheral surface of the second inlet portion 32B.

The first lead-out portion 25A and the first inlet portion 32A are fitted to each other. Specifically, the first lead-out portion 25A is inserted into the first inlet portion 32A, and the first inlet portion 32A is fitted to the first lead-out portion 25A externally in a radial direction. As described above, the central axis line of the first lead-out portion 25A and the central axis line of the first inlet portion 32A commonly are the first axis line X130. Thus, the first lead-out portion 25A and the first inlet portion 32A are coaxially connected. In the present embodiment, the first inlet portion 32A and the first lead-out portion 25A are joined by welding or the like with them being connected to each other in a fitted state.

Similarly, the second lead-out portion 25B and the second inlet portion 32B are fitted to each other. Specifically, the second lead-out portion 25B is inserted into the second inlet portion 32B, and the second inlet portion 32B is fitted to the second lead-out portion 25B externally in a radial direction. As described above, the central axis line of the second lead-out portion 25B and the central axis line of the second inlet portion 32B are commonly the first axis line X130, and the second lead-out portion 25B and the second inlet portion 32B are coaxially connected. In the present embodiment, the second inlet portion 32B and the second lead-out portion 25B are joined by welding or the like with them being connected to each other.

In the present embodiment, the exhaust manifold 30 is fixed to the first exhaust pipe 20A and the second exhaust pipe 20B in a state where the exhaust manifold 30 is located at a predetermined attitude with respect to the first exhaust pipe 20A and the second exhaust pipe 20B by jigs or the like. The predetermined attitude is set in accordance with a model of a lawn mower on which the engine 1 is mounted.

The downstream end of the first branch portion 31A and the downstream end of the second branch portion 31B communicate with each other. The exhaust gas having passed through the first inlet portion 32A and the exhaust gas having passed through the second inlet portion 32B are merged with each other at their downstream ends. That is, the exhaust manifold 30 has a merging portion 33 where the exhaust gas passing through the first inlet portion 32A and the exhaust gas passing through the second inlet portion 32B are merged with each other. The merging portion 33 is configured by the downstream ends of the branch portions 31A and 31B. When viewed along the up-and-down direction, the merging portion 33 is located on the center line XC. The first branch portion 31A is curved diagonally forward left from the left end of the first inlet portion 32A. The second branch portion 31B is curved diagonally forward right from the right end of the second inlet portion 32B. The merging portion 33 constituted by the downstream ends of the first branch portion 31A and the second branch portion 31B is located forward with respect to the inlet portions 32A and 32B in the front-and-rear direction.

The exhaust gas sensor 60 is attached to the merging portion 33. The exhaust gas sensor 60 is attached to the merging portion 33 at such an attitude that the tip thereof faces the inside of the merging portion 33 and this sensor 60 protrudes upward from the upper surface of the merging portion 33.

The collective portion 34 has a common outlet portion 35. The common outlet portion 35 is a portion that leads the exhaust gas flowing into the exhaust manifold 30 to the outside of the exhaust manifold 30. The collective portion 34 extends forward from the merging portion 33. The common outlet portion 35 is constituted by the front end of the collective portion 34. The common outlet portion 35 constitutes downstream ends of the collective portion 34 and the exhaust manifold 30. The collective portion 34 and the common outlet portion 35 each have a tubular shape extending in the front-and-rear direction. Central axes X35 of the collective portion 34 and the common outlet portion 35 each extend in the front-and-rear direction.

As viewed along the up-and-down direction, the collective portion 34 and the common outlet portion 35 are located on the center line XC. As viewed along the up-and-down direction, the central axis line of the collective portion 34 and the common outlet portion 35 align with the center line XC.

The common outlet portion 35 has a shape constant between a case of rotation about its central axis X35 and a case of before the rotation. That is, the common outlet portion 35 has the cross section that is orthogonal to its central axis X35 and has the shape constant at all positions along the central axis X35 before and after the cross section is rotated by a predetermined angle about the central axis X35. In the present embodiment, the collective portion 34 and the common outlet portion 35 each have a cylindrical shape extending in the front-and-rear direction. Therefore, in the present embodiment, the cross section of the common outlet portion 35 has the constant shape before and after the rotation regardless of the angle of the rotation about the central axis X35, and all the angles apply to the predetermined angle. Here, the above angle includes 180 degrees, the common outlet portion 35 has a two-fold symmetric shape, and each cross section of the common outlet portion 35 has a point symmetric shape. Both the outer peripheral surfaces and the inner peripheral surfaces of the collective portion 34 and the common outlet portion 35 each have a cylindrical shape. Further, cross sections orthogonal to the central axis X35 of the collective portion 34 and the common outlet portion 35 each have an annular shape.

Figure 9:
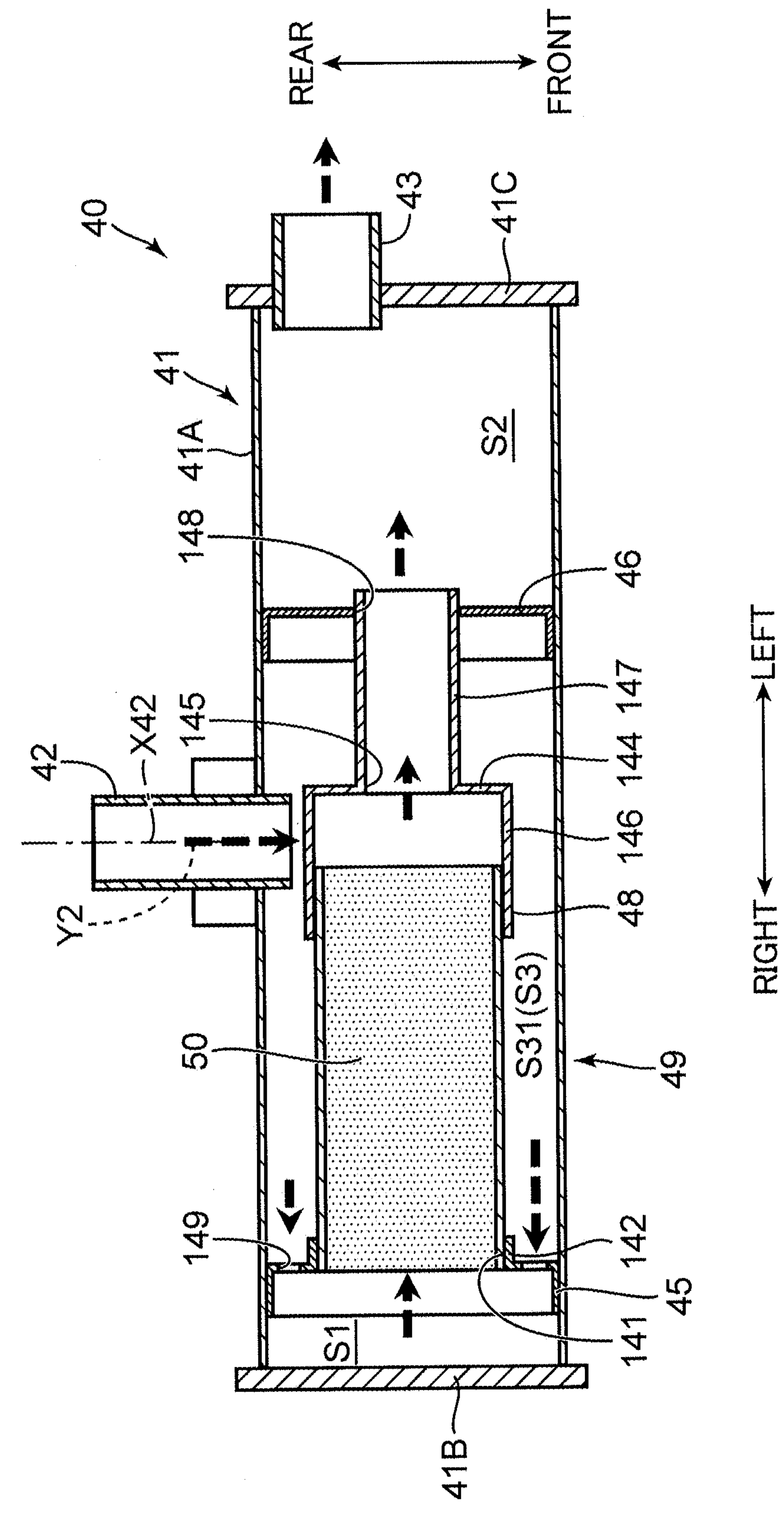
FIG. 9 is a cross-sectional view taken along line IX-IX of FIG. 2.

FIG. 9 is a cross-sectional view taken along line IX-IX of FIG. 2, and illustrates a cross section of the downstream device 40. The downstream device 40 is a catalyst built-in muffler containing a catalyst device 50 that purifies exhaust gas. That is, the downstream device 40 has both a silencing function of reducing exhaust noise and a function of purifying exhaust gas. The downstream device 40 is connected to the exhaust manifold 30.

The downstream device 40 has a shape extending in the right-and-left direction. The downstream device 40 has a tubular shape. That is, the downstream device 40 is a hollow member in which a space through which the exhaust gas flows is formed. The downstream device 40 includes a case 41 in which a space is defined inside, a downstream inlet portion 42, and a downstream outlet portion 43. A downstream inlet portion 42 is for introducing exhaust gas into the case 41. A downstream outlet portion 43 is for leading out exhaust gas from the case 41.

The downstream inlet portion 42 is disposed at the center in a longitudinal direction of the downstream device 40, that is, at the center in the right-and-left direction. The downstream inlet portion 42 has a tubular shape extending in the front-and-rear direction. The central axis X42 of the downstream inlet portion 42 extends in the front-and-rear direction. The downstream inlet portion 42 is fixed to the case 41 with this portion penetrating the outer peripheral surface of the case 41. A front portion of the downstream inlet portion 42 is located inside the case 41. A rear portion of the downstream inlet portion 42 protrudes rearward from the outer peripheral surface of the case 41.

The downstream inlet portion 42 is connected to the common outlet portion 35 of the exhaust manifold 30. Exhaust gas in the exhaust manifold 30 is introduced into the downstream device 40 through the common outlet portion 35 and the downstream inlet portion 42.

The downstream inlet portion 42 and the common outlet portion 35 are coaxially disposed. The downstream inlet portion 42 and the common outlet portion 35 are aligned on a same axis line X140. That is, the central axis line of the downstream inlet portion 42 and the central axis line of the common outlet portion 35 are the same straight line X140. Hereinafter, the axis line X140 is appropriately referred to as a second axis line X140. The second axis line X140 is a straight line extending in the front-and-rear direction.

In the present embodiment, the downstream inlet portion 42 has a cylindrical shape extending in the front-and-rear direction. Both the outer peripheral surface and the inner peripheral surface of the downstream inlet portion 42 each have a cylindrical surface shape.

The downstream inlet portion 42 is connected to the common outlet portion 35 to be inserted thereto. In detail, the rear portion of the downstream inlet portion 42 is inserted into the common outlet portion 35.

The downstream inlet portion 42 is detachably connected to the common outlet portion 35. In the present embodiment, a pipe clamp 71 is disposed in the exhaust system 4. The pipe clamp 71 includes an annular plate-shaped member 71A, a bolt 71B, and a nut 71C. The diameter of the plate-shaped member 71A changes in accordance with a position where the bolt 71B is screwed into the nut 71C. In a case where the common outlet portion 35 and the downstream inlet portion 42 are connected and coupled, the plate-shaped member 71A is attached to the outer peripheral surface of the common outlet portion 35 into which the downstream inlet portion 42 is inserted. Thereafter, if the diameter of the plate-shaped member 71A is reduced, the plate-shaped member 71A tightens the common outlet portion 35 to reduce the diameter thereof. As a result, the common outlet portion 35 and the downstream inlet portion 42 are fastened. In a case where the connection between the common outlet portion 35 and the downstream inlet portion 42 is released, the diameter of the plate-shaped member 71A is increased. As a result, the fastening state described above is released, and the downstream inlet portion 42 and the common outlet portion 35 can be detached. Here, in the present embodiment, a plurality of slits along the front-and-rear direction are formed on the outer peripheral surface of the common outlet portion 35. The common outlet portion 35 thus can be easily expanded and contracted in diameter. Therefore, the downstream inlet portion 42 and the common outlet portion 35 can be easily attached and detached.

The downstream outlet portion 43 is disposed at the left end of the downstream device 40, that is, at the one end in the longitudinal direction of the downstream device 40. The downstream outlet portion 43 leads the exhaust gas, which has flown into the downstream device 40 from the common outlet portion 35, to the outside of the downstream device 40.

The case 41 includes a case main body 41A, a first bottom plate 41B, and a second bottom plate 41C. The case main body 41 has a tubular shape. The first bottom plate 41B has a plate shape and covers the left end of the case main body 41A. The second bottom plate 41C has a plate shape and covers the left end of the case main body 41A. In the present embodiment, the case main body 41A has a cylindrical shape extending in the right-and-left direction. A central axis of the case main body 41A extends in the right-and-left direction. Each of the bottom plates 41B and 41C has an approximately disk shape. The outer shape of the downstream device 40 is generally defined by the case main body 41A, and the downstream device 40 has a bottomed cylindrical shape as a whole. However, the specific shapes of the case main body 41A and the downstream device 40 are not limited to the cylindrical shape. For example, the cross sections of the case main body 41A and the downstream device 40 may have an elliptical shape. Further, the case main body 41A and the downstream device 40 may have a rectangular parallelepiped shape with a rectangular cross section.

A first partition wall 45 and a second partition wall 46 are disposed inside the case 41. The partition walls 45 and 46 each include a surface orthogonal to the right-and-left direction. The inner space of the case 41 is partitioned into three spaces including a first space S1, a second space S2, and a central space S3 in the right-and-left direction by the partition walls 45 and 46. The first space S1 is a space between the first partition wall 45 and the first bottom plate 41B. The second space S2 is a space between the second partition wall 46 and the second bottom plate 41C. The central space S3 is a space between the first partition wall 45 and the second partition wall 46.

A first through hole 141 is formed through the center of the first partition wall 45. A second through hole 148 is formed through the center of the second partition wall 46. A plurality of communication holes 149 is formed through the first partition wall 45. These communication holes 149 are provided on the outer peripheral side of the first through hole 141. These communication holes 149 are aligned in an outer peripheral direction of the first through hole 141. Each of the communication holes 149 communicates the first space S1 and an outer peripheral space S31.

The catalyst device 50 carrying a catalyst is accommodated in the central space S3. The catalyst device 50 has a tubular shape extending in the right-and-left direction. The catalyst is, for example, a three way catalyst. In the present embodiment, the catalyst device 50 has a cylindrical shape. The central axis of the catalyst device 50 extends in the right-and-left direction. The outer peripheral surface of the catalyst device 50 is configured to disable the exhaust gas to pass therethrough. As a result, the exhaust gas is introduced into the catalyst device 50 from one end of the catalyst device 50 in the right-and-left direction, purified, and then discharged from the other end of the catalyst device 50 to the outside of the catalyst device 50.

The case 41 has a first standing wall portion 142. The first standing wall portion 142 rises on the left side from the inner peripheral edge of the first through hole 141. A right end of the catalyst device 50 is supported by the first standing wall portion 142 with the right end being inserted into this wall portion. A right end surface of the catalyst device 50 is exposed to the first space S1 through the first through hole 141.

The case 41 has a cylindrical body 48 extending in the right-and-left direction. The cylindrical body 48 is disposed in the central space S3. The cylindrical body 48 has a bottom portion 144 orthogonal to the right-and-left direction. A third through hole 145 is formed through the center of the bottom portion 144. The cylindrical body 48 includes a second standing wall portion 146 and a communication portion 147. The second standing wall portion 146 extends leftward from the outer peripheral edge of the bottom portion 144. The communication portion 147 extends leftward from the inner peripheral edge of the third through hole 145.

The cylindrical body 48 is fixed to the second partition wall 46 with the communication portion 147 being inserted into the second through hole 148. A left end of the catalyst device 50 is supported by the second standing wall portion 146 with the left end being inserted into this wall portion. A left end surface of the catalyst device 50 is exposed to the second space S2 through the inner space of the cylindrical body 48.

In the central space S3, the catalyst device 50 and the cylindrical body 48 are disposed at positions spaced apart from the inner peripheral surface of the case main body 41A. As a result, a space is defined on the outer peripheries of the catalyst device 50 and the cylindrical body 48. Hereinafter, the space on the outer peripheries of the catalyst device 50 and the cylindrical body 48 in the central space S3 is appropriately referred to as an outer peripheral space S31.

The front end of the downstream inlet portion 42 is disposed in the outer peripheral space S31. The downstream inlet portion 42 and the outer peripheral space S31 communicate with each other.

The downstream outlet portion 43 is fixed to the second bottom plate 41C. The downstream outlet portion 43 has a tubular shape extending in the right-and-left direction. The downstream outlet portion 43 is fixed to the second bottom plate 41C with this portion penetrating the plate. In the present embodiment, the downstream outlet portion 43 has a cylindrical shape. The downstream outlet portion 43 communicates the second space S2 and the outside of the case 41.

With the above configuration, the exhaust gas flows toward the downstream outlet portion 43 while the direction is being changed in the downstream device 40 as indicated by the arrow in FIG. 9. Specifically, the exhaust gas led out from the common outlet portion 35 of the exhaust manifold 30 first flows into the outer peripheral space S31 of the downstream device 40. Next, the exhaust gas flows into the first space S1 from the outer peripheral space S31 through the communication hole 149. Next, the exhaust gas flows into the catalyst device 50 from the outer peripheral space S31. Next, the exhaust gas passes through the catalyst device 50 and flows into the cylindrical body 48. Next, the exhaust gas flows into the second space S2 from the cylindrical body 48 through the cylindrical body 48. The exhaust gas then flows out of the downstream device 40 through the downstream outlet portion 43.

As described above, the exhaust gas is introduced into the catalyst device 50 after passing through the outer peripheral space S31. As described above, the downstream device 40 includes a cubic capacity portion 49 that defines a space as the outer peripheral space S31 that communicates with the common outlet portion 35 and through which the exhaust gas passes before reaching the catalyst device 50. The cubic capacity portion 49 includes the outer peripheral surfaces of the catalyst device 50 and the cylindrical body 48, the case main body 41A, the first partition wall 45, and the second partition wall 46.

Here, the spaces S31, S1, and S2 are defined inside the downstream device 40. The exhaust gas expands in these spaces S31, S1, and S2. Further, the pressure of the exhaust gas is reduced during passage through the communication hole 149. Therefore, the temperature and pressure of the exhaust gas decrease during the passage in the downstream device 40, and an exhaust noise is reduced. Further, since the exhaust gas passes through the catalyst device 50 in the downstream device 40 as described above, the purified exhaust gas is released into the atmosphere.

[Operation]

Figure 10:
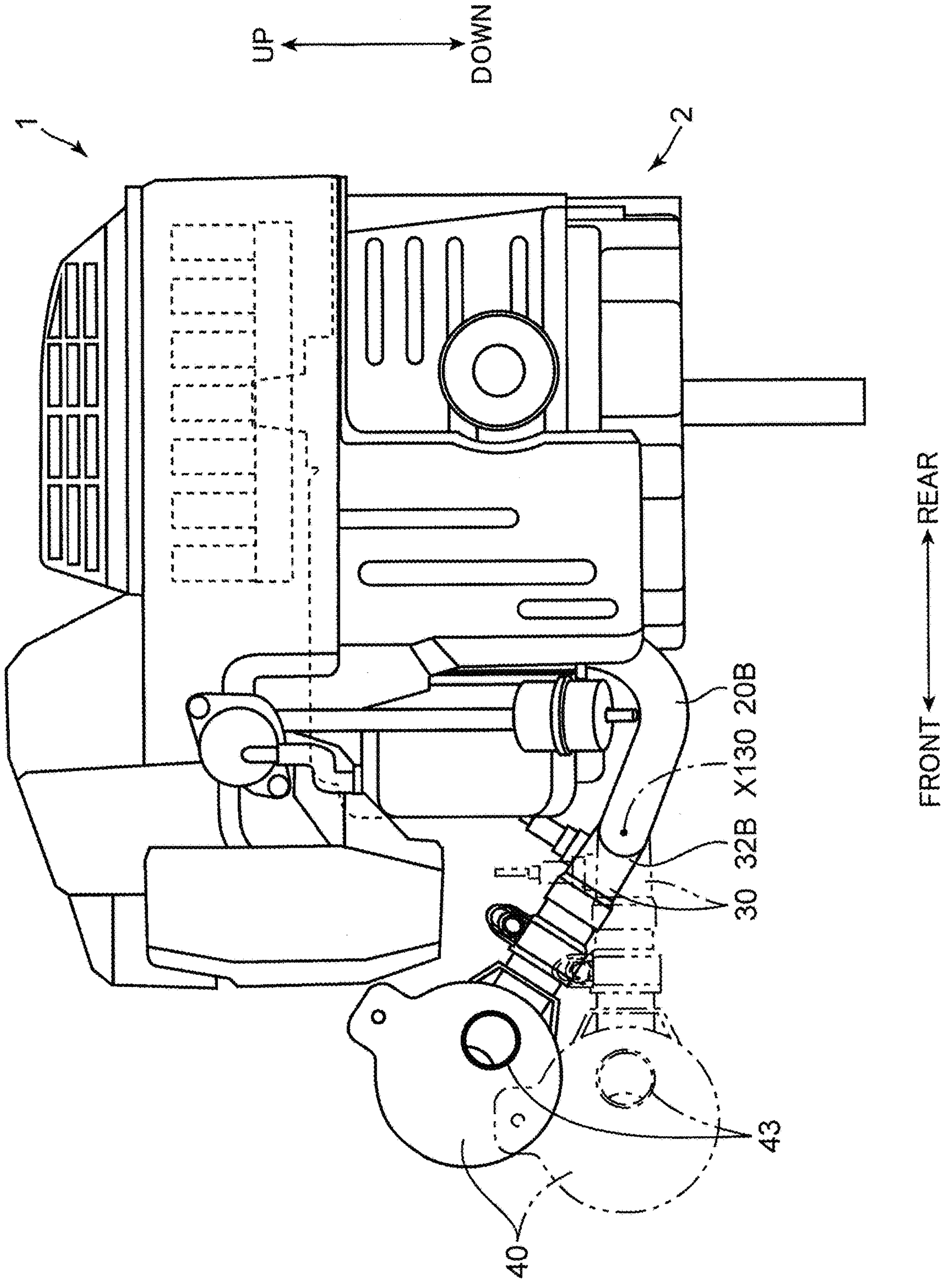
FIG. 10 is a schematic side view of the engine, in which the exhaust manifold at two different positions is indicated by a solid line and a chain line.

As described above, in the engine 1 according to the present embodiment, the first lead-out portion 25A of the first exhaust pipe 20A and the second lead-out portion 25B of the second exhaust pipe 20B face each other in the right-and-left direction. The first inlet portion 32A of the exhaust manifold 30 is connected to the first lead-out portion 25A. The second inlet portion 32B of the exhaust manifold 30 is connected to the second lead-out portion 25B. Further, the central axis X31 of the first lead-out portion 25A and the central axis X32 of the second exhaust pipe 20B are aligned on the same first axis line X130. Therefore, when the exhaust manifold 30 is rotated about the first axis line X130 as between the position indicated by the solid line and the position indicated by the chain line in FIG. 10, the positions of the first inlet portion 32A and the second inlet portion 32B can be maintained respectively at the position corresponding to the first lead-out portion 25A and the position corresponding to the second lead-out portion 25B before and after the rotation.

Therefore, with the engine 1 according to the present embodiment, by rotating the exhaust manifold 30 about the first axis line X130, the relative position of the exhaust manifold 30 with respect to each of the exhaust pipes 20A and 20B can be changed within a connectable range, and the degree of freedom in mounting the engine 1 on the work machine can be increased. In addition, it is possible to implement engines in which the relative position of the exhaust manifold 30 with respect to each of the exhaust pipes 20A and 20B varies while the common exhaust pipes 20A and 20B and the common exhaust manifold 30 are used. Therefore, for example, even in a case where the relative position should be varied depending on the models of work machines on which the engine 1 is mounted, different models of exhaust pipes 20A and 20B and exhaust manifolds 30 do not have to be prepared. Thus, the engine 1 can be mounted on different models of work machines using a common exhaust structure. Therefore, versatility of the engine 1 can be increased. Further, common components can be used among different models of work machines. Therefore, the engine 1 is advantageous from the aspect of cost.

For example, in a lawn mower, the final exhaust gas discharge direction may be set differently for each model. On the other hand, in the engine 1 of the present embodiment, adjustment of the orientation of the exhaust manifold 30 as described above can cope with the final exhaust gas discharge direction. For this reason, the change of the mounting attitude of the entire engine 1 or the structure change of the exhaust manifold 30 are unnecessary, and thus the number of models of lawn mowers on which the common engine 1 can be mounted can be increased.

The disposing space of the downstream device 40 may differ depending on models of the working machines. On the contrary, in the engine 1 of the present embodiment, the above configuration can cope with the difference in the disposing space. For example, in a case where the engine 1 is mounted on a work machine having a small disposing space for the downstream device 40, the downstream device 40 can be disposed at a position close to the engine main body 2 as indicated by the solid line in FIG. 10. On the other hand, in a case where the engine 1 is mounted on a work machine having a wide disposing space for the downstream device 40, the downstream device 40 can be disposed at a position far from and lower than the engine main body 2 as indicated by the chain line in FIG. 10. Here, even if the position of the downstream device 40 is changed, the distance between the position where the exhaust gas in the exhaust manifold 30 is merged and the catalyst device 50 is kept the same. This can make the exhaust gas purification performance common. Therefore, in the engine 1 according to the present embodiment, the exhaust purification performance can be guaranteed while the position of the downstream device 40 can be changed.

Further, in the engine 1 according to the present embodiment, the inner peripheral surfaces of the first inlet portion 32A and the second inlet portion 32B as a cylindrical surface shape. Therefore, regardless of the angle about the first axis line X130 of the exhaust manifold 30, the relative shapes of the inner peripheral surfaces of the inlet portions 32A and 32B with respect to the lead-out portions 25A and 25B can be maintained the same. That is, regardless of the above angle, the shapes of the flow paths through which the exhaust gas flowing from each of the lead-out portions 25A and 25B into each of the inlet portions 32A and 32B passes are maintained the same. Therefore, the relative position of the exhaust manifold 30 with respect to the exhaust pipes 20A and 20B can be freely changed while the flow of the exhaust gas at the connection portions of the inlet portions 32A and 32B and the lead-out portions 25A and 25B are maintained the same.

Further, in the engine 1 according to the present embodiment, the first lead-out portion 25A, the second lead-out portion 25B, the first inlet portion 32A, and the second inlet portion 32B each have a cylindrical shape with the first axis line X130 as the central axis line. The first lead-out portion 25A is inserted into the first inlet portion 32A, and the second lead-out portion 25B is inserted into the second inlet portion 32B. For this reason, regardless of the angle around the first axis line X130 of the exhaust manifold 30, the first lead-out portion 25A can be inserted into the first inlet portion 32A and connected thereto, and the second lead-out portion 25B can be inserted into the second inlet portion 32B and connected thereto.

Figure 11:
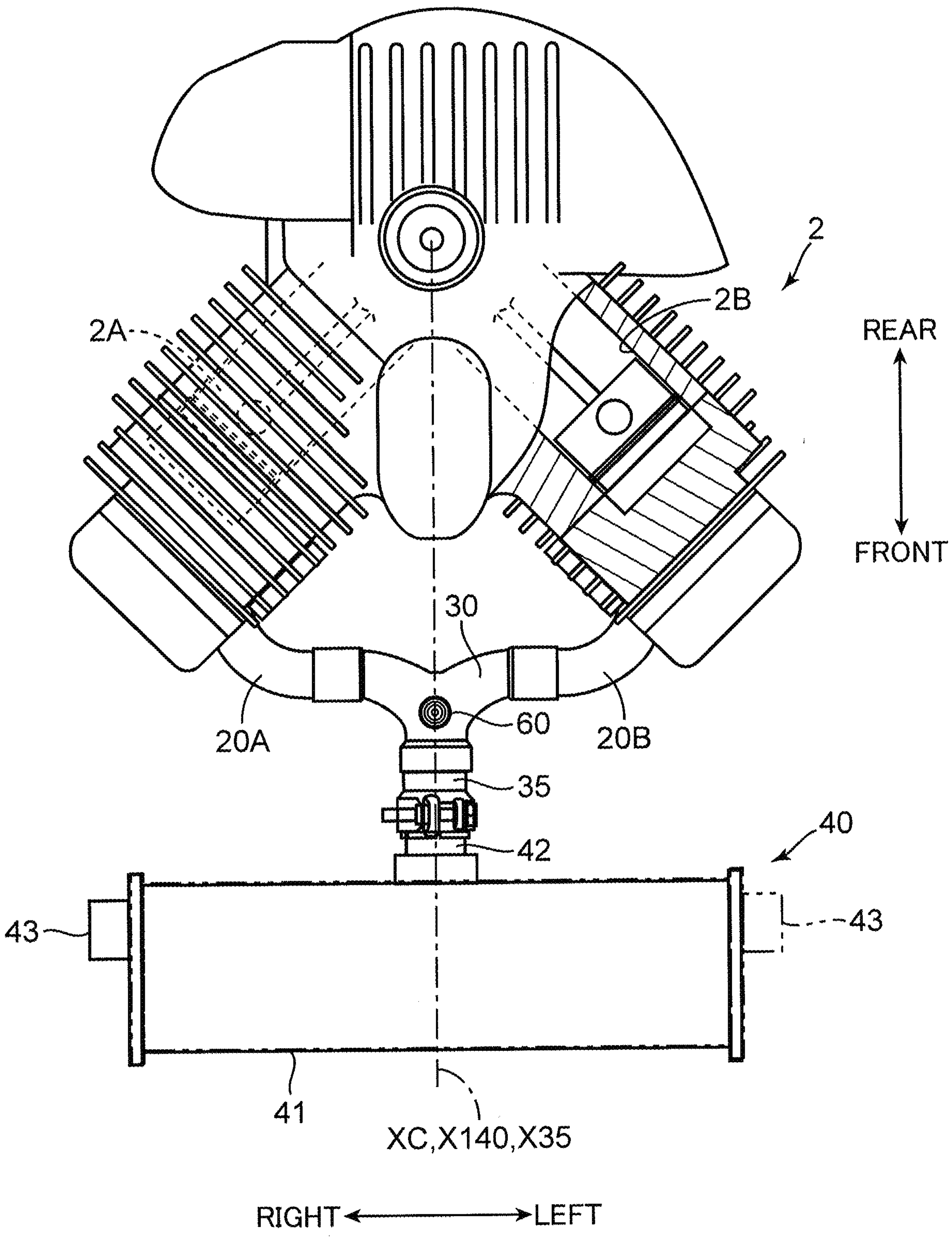
FIG. 11 is a schematic plan view of the engine, in which the downstream devices at two different positions are indicated by a solid line and a chain line.

In the engine 1 according to the present embodiment, the inner peripheral surface of the common outlet portion 35 of the exhaust manifold 30 has a cylindrical shape. Due to this shape, when the downstream device 40 is rotated about the central axis X35 of the common outlet portion 35 as between a position indicated by the solid line and a position indicated by the chain line in FIG. 11, the shape of the inner peripheral surface of the common outlet portion 35 with respect to the downstream inlet portion 42 can be maintained the same before and after the rotation. Therefore, the relative position of the downstream device 40 with respect to the exhaust manifold 30 can be freely changed while the flow of the exhaust gas is maintained the same at the connection portion between the common outlet portion 35 and the downstream inlet portion 42.

Further, in the engine 1 according to the present embodiment, the common outlet portion 35 and the downstream inlet portion 42 each have a cylindrical shape with the second axis line X140 as the central axis line. The downstream inlet portion 42 is inserted into the common outlet portion 35. Therefore, regardless of the angle around the second axis line X140 of the downstream device 40, the downstream inlet portion 42 can be inserted into the common outlet portion 35 and connected thereto.

The downstream inlet portion 42 is disposed at the center of the downstream device 40 in the longitudinal direction. Therefore, regardless of the angle around the second axis line X140 of the downstream device 40, the downstream device 40 can be disposed at a position close to the common outlet portion 35. For example, in a case where the downstream device 40 is attached to the exhaust manifold 30 at an attitude extending in the right-and-left direction, the amount of protrusion of the downstream device 40 in the right-and-left direction with respect to the common outlet portion 35 can be approximately equal between the case indicated by the solid line in FIG. 11 and the case where the downstream device 40 is rotated by 180 degrees as indicated by the chain line. Therefore, regardless of the orientation of the downstream device 40, the downstream device 40 can be avoided from excessively protruding in the right-and-left direction with respect to the common outlet portion 35. In particular, in the configuration where the common outlet portion 35 is disposed on the center line XC as in the above-described embodiment, the downstream device 40 can be avoided from protruding out of the engine main body 2 in the right-and-left direction.

Since the downstream inlet portion 42 is disposed at the center of the longitudinal direction of the downstream device 40, the entire engine 1 can be downsized as compared with the case where the downstream inlet portion 42 is disposed at one end of the downstream device 40 in the longitudinal direction. Specifically, in a case where the downstream inlet portion 42 is disposed at one end in the longitudinal direction of the downstream device 40, the exhaust manifold 30 is connected to the one end, and thus the dimension of the exhaust system in the right-and-left direction around the downstream device 40 increases. On the contrary, according to the present embodiment, since the downstream inlet portion 42 is disposed at the center of the downstream device 40 in the longitudinal direction, the dimension of the exhaust system in the right-and-left direction around the downstream device 40 can be reduced.

Further, in the engine 1 according to the above embodiment, the downstream outlet portion 43 is disposed at the one end of the downstream device 40 in the longitudinal direction. For this reason, the position of the downstream outlet portion 43 can be changed by changing the angle of the downstream device 40 around the second axis line X140. That is, the final discharge position and discharge direction of the exhaust gas can be changed. For example, the position of the downstream outlet portion 43, that is, the position at which the exhaust gas is led out from the downstream device 40 to the outside can be changed between the right side and the left side in the case indicated by the solid line and the case indicated by the chain line in FIG. 11. As a result, for example, the discharge direction of the exhaust gas can be changed depending on the discharge direction of lawn grass set for each model of the lawn mower. Specifically, even in lawn mowers of different models, the exhaust direction can be made away from the exhaust direction of lawn grass by using parts of the common engine main body.

Figure 12:
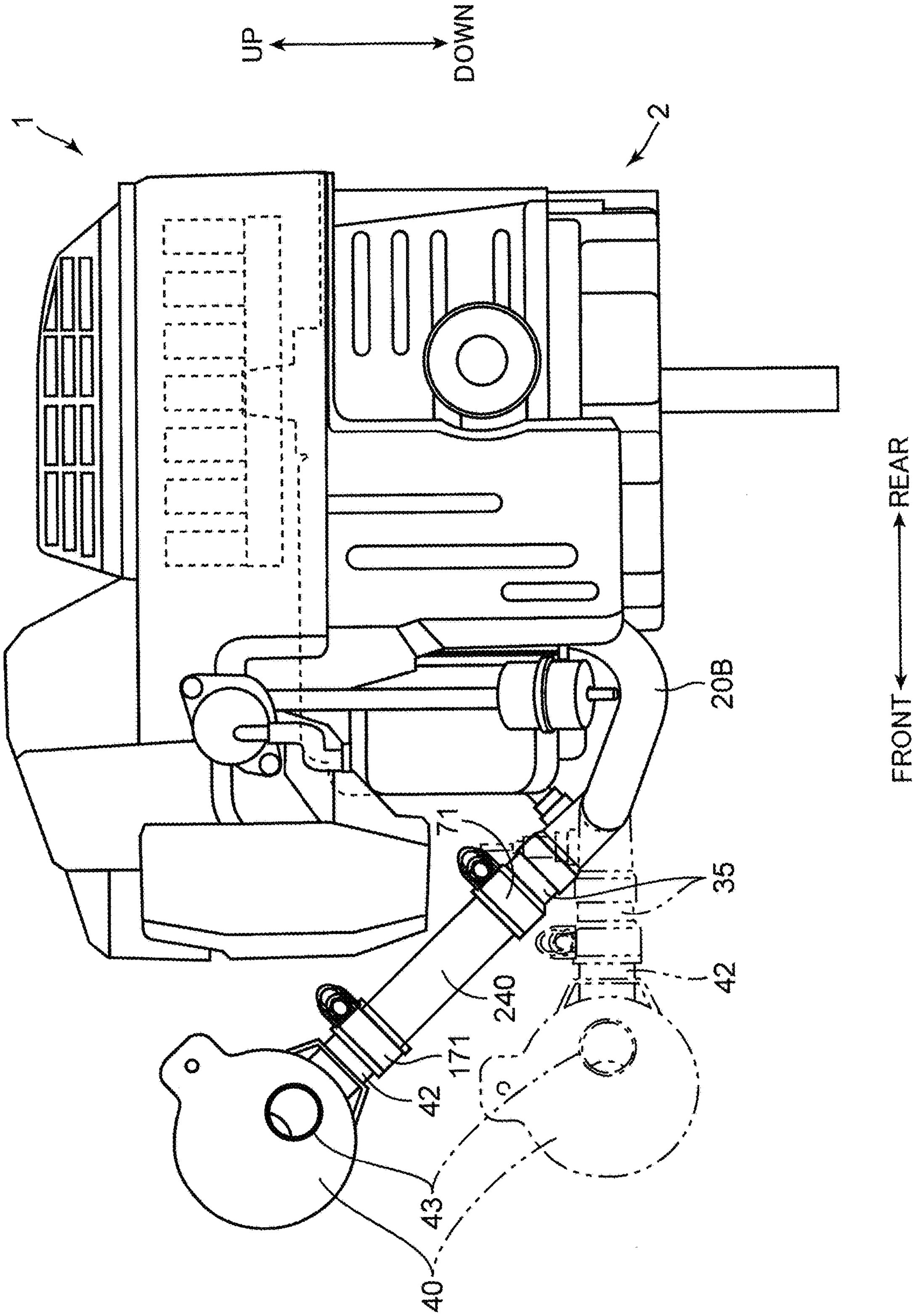
FIG. 12 is a schematic plan view of the engine, illustrating a state where a pipe member is mounted between the exhaust manifold and the downstream device.

In the engine 1 according to the above embodiment, the downstream device 40 is detachably connected to the common outlet portion 35. Therefore, the position of the downstream device 40 can be easily changed with respect to the common outlet portion 35. Further, as indicated by a solid line in FIG. 12, another member 240 can be attached between the downstream device 40 and the common outlet portion 35, so that the position of the downstream device 40 can be changed more easily. Specifically, in the example of the solid line in FIG. 12, a pipe member through which the exhaust gas can flow is attached between the common outlet portion 35 and the downstream inlet portion 42 to increase the distance from the common outlet portion 35 to the downstream device 40. In the example of the solid line in FIG. 12, the downstream device 40 is disposed at a relatively high position. This can prevent interference with other mounted components mounted on the lawn mower, and can heighten the exhaust direction of the exhaust gas can be increased.

In the engine 1 according to the present embodiment, the exhaust manifold 30 is disposed between the first reference line X111 and the second reference line X112 as viewed along the up-and-down direction. Therefore, the exhaust manifold 30 can be compactly disposed near the engine main body 2 using the space between the first reference line X111 and the second reference line X112.

Further, in the engine 1 according to the present embodiment, the common outlet portion 35 is disposed on the center line XC that divides the angle formed by the first reference line X111 and the second reference line X112 into two equal parts. Therefore, the distance between each of the cylinders 2A and 2B and the common outlet portion 35 can be equalized, and the flow of the exhaust gas can be equalized between the cylinders.

In the engine 1 according to the present embodiment, the downstream device 40 has both the silencing function of reducing exhaust noise and the function of purifying exhaust gas. Therefore, the exhaust noise can be reduced, and exhaust gas can be purified. In the present embodiment, the outer peripheral space S31 is defined in a portion upstream the catalyst device 50 in the downstream device 40. The exhaust gas that has passed through the outer peripheral space S31 is introduced into the catalyst device 50. Thus, the exhaust gas can be introduced into the catalyst after being expanded and cooled in the outer peripheral space S31. This can prevent the temperature of the catalyst from being excessively raised by the exhaust gas. This reduces deterioration of the catalyst.

Further, the engine 1 according to the present embodiment is configured so that the exhaust gas flows toward the downstream outlet portion 43 while changing the orientation in the downstream device 40 as indicated by the arrow in FIG. 9. Thus, the flow path length of the exhaust gas in the downstream device 40 can be lengthened. Therefore, the silencing effect can be enhanced.

In the engine 1 according to the above embodiment, the exhaust gas sensor 60 is attached to the merging portion 33 where the exhaust gas passing through the first inlet portion 32A, that is, the exhaust gas lead out from the first cylinder 2A, and the exhaust gas passing through the second inlet portion 32B, that is, the exhaust gas led out from the second cylinder 2B is merged. Therefore, the property of the entire exhaust gas lead out from the engine main body 2 can be detected by the exhaust gas sensor 60.

[Modifications]

The inner peripheral surfaces of the first inlet portion 32A and the second inlet portion 32B may not have a cylindrical surface shape. The first inlet portion 32A and the second inlet portion 32B may not have a cylindrical shape.

However, if the cross sections, which is orthogonal to the first axis line X130, of the first inlet portion 32A and the second inlet portion 32B have shapes that coincide with each other both when the exhaust manifold 30 is at two different positions; the first position and the second position around the first axis line X130, the relative shapes of the inlet portions 32A and 32B with respect to the lead-out portions 25A and 25B can be maintained the same when the exhaust manifold 30 is at the first position and the second position, and the position of the exhaust manifold 30 can be changed while their connections are achieved.

The first inlet portion 32A and the second inlet portion 32B may be configured so that the cross-sectional shapes coincide with each other when the exhaust manifold 30 is at two different positions; the first position and the second position around the first axis line X130, and specific shapes of the first inlet portion 32A and the second inlet portion 32B are not limited to the above-described cylindrical shape. For example, the shapes of the first inlet portion 32A and the second inlet portion 32B may be rotationally symmetric about the first axis line X130. That is, the first inlet portion 32A and the second inlet portion 32B may be formed so that their shapes at a time when rotation by (360/n) degrees is performed overlap shapes before the rotation, where n is an integer of 2 or more. Specifically, these cross-sectional shapes may be regular polygonal shapes, such as regular triangle shapes or square shapes, elliptical shapes, and the like. The rotation angle at a time the shapes coincide may be any angle in a range greater than 0 degrees and smaller than 360 degrees. In addition, the first inlet portion 32A and the second inlet portion 32B may have different shapes. For example, both the first inlet portion 32A and the second inlet portion 32B may have a cylindrical shape, and diameters thereof may be different from each other.

Similarly to the inlet portions 32A and 32B, the shapes of the first lead-out portion 25A and the second lead-out portion 25B are not limited to the cylindrical shape. Specifically, the first lead-out portion 25A and the second lead-out portion 25B may have shapes corresponding to the first inlet portion 32A and the second inlet portion 32B. That is, similarly to the inlet portions 32A and 32B, the lead-out portions 25A and 25B each may have a shape that is rotationally symmetric with respect to the first axis line X130, and cross-sectional shapes thereof may be regular polygonal shapes, such as regular triangle shapes or square shapes, elliptical shapes, and the like. The first lead-out portions and the second inlet portion 32B may have different shapes. For example, both the first inlet portion 32A and the second inlet portion 32B may have a cylindrical shape, and diameters thereof may be different from each other.

Further, the connection structure between the first lead-out portion 25A and the first inlet portion 32A and the connection structure between the second lead-out portion 25B and the second inlet portion 32B are not limited to the above-described ones. For example, the first lead-out portion 25A and the first inlet portion 32A may be coupled, and the second lead-out portion 25B and the second inlet portion 32B may be coupled by bolts or pipe clamps instead of welding. Further, the first inlet portion 32A is inserted into the first lead-out portion 25A and they are fitted to each other. Similarly, the second inlet portion 32B is inserted into the second lead-out portion 25B and they are fitted to each other.

The common outlet portion 35 may not have a cylindrical shape. However, if the common outlet portion 35 has the cross section that is orthogonal to the central axis X35 and has a shape constant before and after the cross section is rotated about the central axes X35 by a predetermined angle, the positions of the common outlet portion 35 and the devices such as the downstream device 40 connected thereto can be changed within a range of being connectable to the common outlet portion 35. In a case of rotation about the central axis X35 of the common outlet portion 35 by a predetermined angle, the common outlet portion 35 has the cross section that is orthogonal to the central axis X35 and has a shape constant before and after the rotation. Example of the shape of the cross section are a regular polygon shape and a point symmetrical shape.

The position of the downstream inlet portion 42 is not limited to the center of the downstream device 40 in the longitudinal direction. The position of the downstream inlet portion 42 may be a position deviated from the center of the downstream device 40 in the longitudinal direction.

The position of the downstream outlet portion 43 is not limited to the one end of the downstream device 40 in the longitudinal direction. That is, the position of the downstream outlet portion 43 may be a position deviated from the one end of the downstream device 40 in the longitudinal direction. A plurality of downstream outlet portions may be disposed in the downstream device 40 so that the exhaust gas is led out from a plurality of places of the downstream device 40.

Further, the specific structure of the downstream device 40 is not limited to the above-described one. The downstream device 40 may have only one of the silencing function of reducing exhaust noise and the function of purifying exhaust gas. The downstream device 40 may be undetachably connected to the common outlet portion 35. The downstream device 40 may be omitted. The case main body 41 and the downstream device 40 may be formed so that their cross sections are not limited to the cylindrical shape and have an elliptical shape, a rectangular shape, or a polygonal shape.

The mounting position of the exhaust gas sensor 60 is not limited to the merging portion 33. The exhaust gas sensor 60 is attached to, for example, the downstream device 40. The exhaust gas sensor 60 may be omitted.

Further, the engine main body 2 is not limited to a V-twin engine, and may be an engine having more than two cylinders. The engine main body 2 may be an multi-cylinder in-line engine in which a plurality of cylinders is aligned in series.

Further, the positions of the exhaust manifold 30 and the common outlet portion 35 are not limited to the above-described positions. That is, the exhaust manifold 30 and the common outlet portion 35 may be disposed at positions deviated from the center line XC. Specifically, the exhaust manifold 30 and the common outlet portion 35 may be disposed at positions offset from the center line XC in the right-and-left direction. The exhaust manifold 30 and the common outlet portion 35 may be provided at a position deviated from the position between the first reference line X111 and the second reference line X112 when viewed along the up-and-down direction.

In addition, the exhaust manifold 30 may be disposed at a position different from a path for wind sent from the fan 8. The fan 8 may be omitted. An insulator for blocking heat released from the engine main body 2 may be disposed between the exhaust manifold 30 and the engine main body 2.

Further, the mounting attitude of the engine 1 on the work machine is not limited to the attitude in which the crank axis line X1 extends in the up-and-down direction. For example, the engine 1 may be mounted on the work machine at an attitude in which the crank axis line X1 extends in the horizontal direction.

Further, the device on which the engine 1 is mounted is not limited. For example, the engine 1 may be mounted on an agricultural work machine, a construction machine, or a work machine other than a lawn mower. The engine 1 may be mounted on another vehicle.

The above embodiment has described the case where the center line XC dividing the entire engine main body 2 into halves coincide with the line dividing the angle formed by the first reference line X111 and the second reference line X112 into two equal parts when viewed along the up-and-down direction, but both the lines do not necessarily coincide with each other. In other words, as the engine main body, an engine main body in which the center line XC dividing the entire engine main body 2 into halves does not coincide with the line dividing the angle formed by the first reference line X111 and the second reference line X112 into two equal parts may be used.

[Summary]

The embodiment and its modifications are summarized as follows.

An engine according to one aspect of the present disclosure includes an engine main body including a first cylinder and a second cylinder, a first exhaust pipe that is connected to the engine main body and into which exhaust gas is introduced from the first cylinder, a second exhaust pipe that is connected to the engine main body and into which exhaust gas is introduced from the second cylinder, and an exhaust manifold including a first inlet portion connected to a first lead-out portion that is a downstream end of the first exhaust pipe, a second inlet portion connected to a second lead-out portion that is a downstream end of the second exhaust pipe, and a common outlet portion that leads out exhaust gas flowing in from the first inlet portion and the second inlet portion, in which the first lead-out portion and the second lead-out portion face each other with central axes of the first lead-out portion and the second lead-out portion aligning on a same line.

According to the present disclosure, when the exhaust manifold is rotated about the first axis line, the positions of the first inlet portion and the second inlet portion can be maintained respectively as the position corresponding to the first lead-out portion and the position corresponding to the second lead-out portion before and after the rotation. Therefore, by rotating the exhaust manifold about the first axis line, the relative position of the exhaust manifold with respect to each exhaust pipe can be changed within a range in which the exhaust manifold and each exhaust pipe are connectable, and the degree of freedom in mounting the exhaust system on a work machine or the like can be enhanced. Further, it is possible to implement engines in which the relative position of the exhaust manifold with respect to each exhaust pipes varies while common exhaust pipes and common exhaust manifold are used. Thus, for example, even in a case where the relative position should be varied depending on the models of vehicles on which the engine is mounted, different models of exhaust pipes and exhaust manifolds do not have to be prepared. For this reason, the present disclosure is advantageous from the aspect of cost.

Preferably, the first inlet portion has a cross section that is orthogonal to the axis line and has a shape constant between a case where the exhaust manifold is at a predetermined first position and a case where the exhaust manifold is rotated about the axis line from the first position to a second position different from the first position, and the second inlet portion has a cross section that is orthogonal to the axis line and has a shape constant between the cases where the exhaust manifold is at the first position and at the second position.

According to this aspect, when the exhaust manifold is at the first position and the second position, the relative shape of each inlet portion with respect to each lead-out portion can be maintained the same, and the position of the exhaust manifold can be changed while these connections is achieved.

Preferably, the first inlet portion and the second inlet portion each have a cylindrical inner peripheral surface.

According to this aspect, regardless of the angle around the first axis line of the exhaust manifold, the relative shapes of the inner peripheral surfaces of the inlet portions with respect to the lead-out portions can be maintained the same. Therefore, the relative position of the exhaust manifold with respect to each of the exhaust pipes can be freely changed while the flow of exhaust gas at the connection portions of the inlet portions and the lead-out portions are being equalized.

Preferably, the first lead-out portion, the second lead-out portion, the first inlet portion, and the second inlet portion each have a cylindrical shape with the first axis line as a central axis line, the first lead-out portion is inserted into the first inlet portion, and the second lead-out portion is inserted into the second inlet portion.

According to this aspect, regardless of the angle around the first axis line of the exhaust manifold, the first lead-out portion can be inserted into the first inlet portion and connected thereto, and the second lead-out portion can be inserted into the second inlet portion and connected thereto.

Preferably, the engine main body includes a first piston that reciprocates in the first cylinder, a second piston that reciprocates in the second cylinder, and a crankshaft that is rotationally driven by the first piston and the second piston, the first cylinder and the second cylinder are disposed with a first cylinder axis line that is an axis line of the first cylinder intersecting a second cylinder axis line that is an axis line of the second cylinder as viewed along a crank axis line that is a rotation center line of the crankshaft, and the exhaust manifold is disposed between a first reference line on the first cylinder axis line and a second reference line on the second cylinder axis line as viewed along the crank axis line, the first reference line extending toward the first cylinder from an intersection on the first cylinder axis line with respect to the second cylinder axis line, the second reference line extending toward the second cylinder from the intersection.

According to this aspect, the exhaust manifold can be compactly disposed near the engine main body using the space between the first reference line and the second reference line.

Preferably, the common outlet portion is disposed on a center line of the engine main body.

According to this aspect, the weight balance of the engine including the engine main body and the exhaust manifold can be improved.

Specifically, the common outlet portion is preferably disposed on the center line that divides an angle formed by the first reference line and the second reference line into equal halves as viewed along the crank axis line.

According to this aspect, the weight balance of the engine including the engine main body and the exhaust manifold can be improved, and the distances between the cylinder 2A and the exhaust manifold 30 and between the cylinder 2B and the exhaust manifold 30 can be equalized.

The crank axis line may be a line extending in a vertical direction.

Preferably, the common outlet portion has a cross section that is orthogonal to a central axis of the common outlet portion and has a shape constant before and after the cross section is rotated by a predetermined angle about the central axis of the common outlet portion.

According to this aspect, in a case where a component to be connected, which is a separately prepared component, is connected to the common outlet portion, a relative position of the component to be connected with respect to the common outlet portion can be changed within a range in which this component is connectable to the common outlet portion.

Preferably, the common outlet portion has the cross section that is orthogonal to the central axis of the common outlet portion and has a point symmetrical shape.

According to this aspect, in a case where a component to be connected, which is a separately prepared component, is connected to the common outlet portion, the component to be connected and the common outlet portion can be connected to each other at both a predetermined attitude and an attitude rotated by 180 degrees about the central axis of the common outlet portion, and the relative position of the component to be connected with respect to the exhaust manifold can be freely changed.

Preferably, a downstream device includes a downstream inlet portion connected to the common outlet portion and has at least one of a function of reducing exhaust noise and a function of purifying exhaust gas.

According to this aspect, the downstream device can perform at least one of reduction of the exhaust noise and purification of exhaust gas. In addition, in the present disclosure, as described above, the position of the exhaust manifold can be changed within a range in which the exhaust manifold and each exhaust pipe are connectable, and accordingly, the position of the downstream device connected to the exhaust manifold can also be changed.

Preferably, the common outlet portion has a cross section that is orthogonal to a central axis of the common outlet portion and has a shape constant before and after the cross section is rotated by a predetermined angle about the central axis of the common outlet portion, the downstream device has a tubular shape extending in a predetermined direction, and the downstream inlet portion is disposed at a center of the downstream device in a longitudinal direction.

According to this aspect, the relative position of the downstream device with respect to the common outlet portion can be changed within a range in which the downstream device is connectable to the common outlet portion. Further, since the downstream inlet portion is provided at the center of the longitudinal direction of the downstream device, the downstream device can be disposed at a position close to the common outlet portion regardless of the relative position.

Preferably, the common outlet portion has a cross section that is orthogonal to a central axis of the common outlet portion and has a shape constant before and after the cross section is rotated by a predetermined angle about the central axis of the common outlet portion, and the downstream device includes a downstream outlet portion that is provided at a position separated from the downstream inlet portion in a longitudinal direction of the downstream device and leads out exhaust gas flowing into the downstream device from the common outlet portion.

According to this aspect, the position of the downstream outlet portion can be changed by changing the relative position of the downstream device with respect to the common outlet portion.

Preferably, the downstream device is detachably connected to the common outlet portion.

According to this aspect, the position of the downstream device can be easily changed.

Preferably, the downstream device includes a cubic capacity portion defining a space communicating with the common outlet portion, and a catalyst into which exhaust gas that has passed through the space defined by the cubic capacity portion is introduced.

According to this aspect, the exhaust gas can be expanded in the space defined by the cubic capacity portion, and a temperature and a pressure of the exhaust gas are reduced. Therefore, exhaust noise can be reduced, and the temperature of the exhaust flowing into the catalyst can be kept low, thereby reducing the deterioration of the catalyst.

Preferably, the engine further includes a fan that sends wind to the engine main body, in which the exhaust manifold is disposed in a path where wind sent from the fan passes.

According to this aspect, the temperature of the exhaust gas flowing into the catalyst through the exhaust manifold can be decreased by wind from the fan, and the deterioration of the catalyst can be reduced.

Preferably, the exhaust manifold includes a merging portion where exhaust gas passing through the first inlet portion and exhaust gas passing through the second inlet portion are merged with each other, and to the merging portion, an exhaust gas sensor that detects a property of the exhaust gas passing through the merging portion is attached.

According to this aspect, the exhaust gas sensor can detect the property of the entire exhaust gas discharged from the engine main body.

Preferably, the engine is mounted on a lawn mower.

According to this aspect, interference with other onboard components mounted on the lawn mower can be prevented, and the degree of freedom of mounting the engine on the lawn mower is improved. Further, the exhaust gas discharge direction can be changed in accordance with the change in the relative position of the exhaust manifold. Therefore, the discharge direction of the exhaust gas can be easily changed in accordance with the discharge direction of lawn grass.

An exhaust system according to one aspect of the present disclosure is an exhaust system applied to an engine main body including a first cylinder and a second cylinder, the system including a first exhaust pipe, a second exhaust pipe, and an exhaust manifold including a first inlet portion connected to a first lead-out portion that is a downstream end of the first exhaust pipe, a second inlet portion connected to a second lead-out portion that is a downstream end of the second exhaust pipe, and a common outlet portion that leads out exhaust gas flowing in from the first inlet portion and the second inlet portion, in which the first lead-out portion and the second lead-out portion face each other with central axes of the first lead-out portion and the second lead-out portion aligning on a same line.

According to the present disclosure, when the exhaust manifold is rotated about the first axis line, the positions of the first inlet portion and the second inlet portion can be maintained respectively as the position corresponding to the first lead-out portion and the position corresponding to the second lead-out portion before and after the rotation. Therefore, by rotating the exhaust manifold about the first axis line, the relative position of the exhaust manifold with respect to each exhaust pipe can be changed within a range in which the exhaust manifold and each exhaust pipe are connectable, and the degree of freedom in mounting the exhaust system on a work machine or the like can be enhanced. Further, it is possible to implement engines in which the relative position of the exhaust manifold with respect to each exhaust pipes varies while common exhaust pipes and common exhaust manifold are used. Thus, for example, even in a case where the relative position should be varied depending on the models of vehicles on which the exhaust system is mounted, different types of exhaust pipes and exhaust manifolds do not have to be prepared. For this reason, the exhaust system is advantageous from the aspect of cost.

The invention claimed is:

1. An engine comprising:

an engine main body including a first cylinder and a second cylinder;

a first exhaust pipe that is connected to the engine main body and into which exhaust gas is introduced from the first cylinder;

a second exhaust pipe that is connected to the engine main body and into which exhaust gas is introduced from the second cylinder; and an exhaust manifold including a first inlet portion connected to a first lead-out portion that is a downstream end of the first exhaust pipe, a second inlet portion connected to a second lead-out portion that is a downstream end of the second exhaust pipe, and a common outlet portion that leads out exhaust gas flowing in from the first inlet portion and the second inlet portion, wherein:

the first cylinder and the second cylinder are disposed with a first cylinder axis line that is an axis line of the first cylinder forming a V shape together with a second cylinder axis line that is an axis line of the second cylinder as viewed along a crank axis line that is a rotation center line of a crankshaft, the exhaust manifold is disposed between the first cylinder axis line and the second cylinder axis line as viewed along the crank axis line, the exhaust manifold is not fixed to the engine main body, the first lead-out portion and the second lead-out portion face each other with central axes of the first lead-out portion and the second lead-out portion aligning on a same axis line, the first inlet portion has a cross section that is orthogonal to the axis line and has a shape constant between a case where the exhaust manifold is at a predetermined first position and a case where the exhaust manifold is rotated about the axis line from the first position to a second position different from the first position, and the second inlet portion has a cross section that is orthogonal to the axis line and has a shape constant between the cases where the exhaust manifold is at the first position and at the second position.

2. The engine according to claim 1, wherein:

the first inlet portion and the second inlet portion each have a cylindrical inner peripheral surface, and an end surface of the first inlet portion and an end surface of the second inlet portion are perpendicular to the axis line.

3. The engine according to claim 2, wherein:

the first lead-out portion, the second lead-out portion, the first inlet portion, and the second inlet portion each have a cylindrical shape with the axis line as a central axis line, the first lead-out portion is inserted into the first inlet portion, and the second lead-out portion is inserted into the second inlet portion.

4. The engine according to claim 1, wherein:

the engine main body includes a first piston that reciprocates in the first cylinder, a second piston that reciprocates in the second cylinder, and the crankshaft that is rotationally driven by the first piston and the second piston, the first cylinder and the second cylinder are disposed with the first cylinder axis line intersecting the second cylinder axis line as viewed along the crank axis line, and the exhaust manifold is disposed between a first reference line on the first cylinder axis line and a second reference line on the second cylinder axis line as viewed along the crank axis line, the first reference line extending toward the first cylinder from an intersection on the first cylinder axis line with respect to the second cylinder axis line, the second reference line extending toward the second cylinder from the intersection.

5. The engine according to claim 4, wherein the common outlet portion is disposed on a center line of the engine main body.

6. The engine according to claim 5, wherein the common outlet portion is disposed on the center line that divides an angle formed by the first reference line and the second reference line into equal halves as viewed along the crank axis line.

7. The engine according to claim 4, wherein the crank axis line extends in a vertical direction.

8. The engine according to claim 7, wherein:

the first exhaust pipe is below the first cylinder, the second exhaust pipe is below the second cylinder, and the exhaust gas sensor that detects a property of the exhaust gas passing through the exhaust manifold is fixedly attached to the exhaust manifold at such an attitude that the exhaust gas sensor protrudes upward from an upper surface of the exhaust manifold.

9. The engine according to claim 1, wherein;

the common outlet portion has a cross section that is orthogonal to a central axis of the common outlet portion and has a point symmetrical shape.

10. The engine according to claim 1, further comprising:

a downstream device including a downstream inlet portion connected to the common outlet portion and has at least one of a function of reducing exhaust noise and a function of purifying exhaust gas.

11. The engine according to claim 10, wherein;

the common outlet portion has a cross section that is orthogonal to a central axis of the common outlet portion and has a point symmetrical shape, the downstream device has a tubular shape extending in a predetermined direction, and the downstream inlet portion is disposed at a center of the downstream device in a longitudinal direction.

12. The engine according to claim 10, wherein;

the common outlet portion has a cross section that is orthogonal to a central axis of the common outlet portion and has a point symmetrical shape, and the downstream device includes a downstream outlet portion that is at a position separated from the downstream inlet portion in a longitudinal direction of the downstream device and leads out exhaust gas flowing into the downstream device from the common outlet portion.

13. The engine according to claim 10, wherein the downstream device is detachably connected to the common outlet portion.

14. The engine according to claim 10, wherein the downstream device includes a cubic capacity portion defining a space communicating with the common outlet portion, and a catalyst into which exhaust gas that has passed through the space defined by the cubic capacity portion is introduced.

15. The engine according to claim 14, further comprising:

a fan that sends wind to the engine main body, wherein the exhaust manifold is disposed in a path where wind sent from the fan passes.

16. The engine according to claim 1, wherein;

the exhaust manifold includes a merging portion where exhaust gas passing through the first inlet portion and exhaust gas passing through the second inlet portion are merged with each other, and the engine further comprises an exhaust gas sensor that detects a property of the exhaust gas passing through the merging portion and is attached to the merging portion.

17. The engine according to claim 16, wherein:

the exhaust gas sensor is fixedly attached to the exhaust manifold at such an attitude that the exhaust gas sensor protrudes outward from an outer peripheral surface of the exhaust manifold.

18. The engine according to claim 1, wherein the engine is mounted on a lawn mower.

19. An exhaust system applied to an engine main body including a first cylinder and a second cylinder, the system comprising:

a first exhaust pipe;

a second exhaust pipe; and an exhaust manifold including a first inlet portion connected to a first lead-out portion that is a downstream end of the first exhaust pipe, a second inlet portion connected to a second lead-out portion that is a downstream end of the second exhaust pipe, and a common outlet portion that leads out exhaust gas flowing in from the first inlet portion and the second inlet portion, wherein:

the first cylinder and the second cylinder are disposed with a first cylinder axis line that is an axis line of the first cylinder forming a V shape together with a second cylinder axis line that is an axis line of the second cylinder as viewed along a crank axis line that is a rotation center line of a crankshaft, the exhaust manifold is disposed between the first cylinder axis line and the second cylinder axis line as viewed along the crank axis line, the exhaust manifold is not fixed to the engine main body, the first lead-out portion and the second lead-out portion face each other with central axes of the first lead-out portion and the second lead-out portion aligning on a same axis line, the first inlet portion has a cross section that is orthogonal to the axis line and has a shape constant between a case where the exhaust manifold is at a first position and a case where the exhaust manifold is rotated about the axis line from the first position to a second position different from the first position, and the second inlet portion has a cross section that is orthogonal to the axis line and has a shape constant between the cases where the exhaust manifold is at the first position and at the second position.

* * * * *